United States Patent
Chen et al.

(10) Patent No.: US 10,142,015 B2
(45) Date of Patent: Nov. 27, 2018

(54) METHOD AND APPARATUS FOR DETECTING SHARED RISK LINK GROUPS

(71) Applicant: Alibaba Group Holding Limited, George Town, Grand Cayman (KY)

(72) Inventors: Xiuzhong Chen, Hangzhou (CN); Chongjin Xie, Hangzhou (CN); Junying Pang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 15/014,833

(22) Filed: Feb. 3, 2016

(65) Prior Publication Data

US 2016/0241333 A1    Aug. 18, 2016

(30) Foreign Application Priority Data

Feb. 16, 2015    (CN) .......................... 2015 1 0083681

(51) Int. Cl.
*H04B 10/08*    (2006.01)
*H04B 17/00*    (2015.01)
(Continued)

(52) U.S. Cl.
CPC .......... *H04B 10/0775* (2013.01); *G01M 11/00* (2013.01); *H04B 10/0731* (2013.01); *H04B 10/07955* (2013.01)

(58) Field of Classification Search
USPC .............................................. 398/16, 17, 25
See application file for complete search history.

(56) References Cited

U.S. PATENT DOCUMENTS 4,885,578 A    12/1989   Perry et al.
5,384,635 A    1/1995    Cohen et al.
(Continued)

FOREIGN PATENT DOCUMENTS

EP    88311618.8 A2    6/1989

OTHER PUBLICATIONS

Greenburg et al, Auto-Discover of Shared Risk Link Groups, Journal, AT&T Labs—Research, Florham Park and Red Bank, NJ, USA.
(Continued)

*Primary Examiner* — David Payne
*Assistant Examiner* — Pranesh Barua

(57) ABSTRACT

A method and device for detecting shared risk link groups is disclosed. The method comprises injecting a probe beam, respectively, into a first test link and a second test link. The method further includes recording, respectively, a first curve of a time-varying first power corresponding to the first backlight and a second curve of a time-varying second power corresponding to the second backlight; calculating a resemblance value for the first curve and the second curve; and judging, based on the resemblance value, whether the first test link and the second test link are located in the same shared risk link group. The method and device for detecting shared risk link groups provided by embodiments of the present invention detect by testing a power characteristic of backlight of a probe beam in test links and, based on that one-dimensional power characteristic, judge whether the test links are in the same shared risk link group, which are simpler in application than those in the prior art.

18 Claims, 18 Drawing Sheets

(51) Int. Cl.
 *H04B 10/077* (2013.01)
 *H04B 10/079* (2013.01)
 *G01M 11/00* (2006.01)
 *H04B 10/073* (2013.01)

(56) References Cited

U.S. PATENT DOCUMENTS

| | | | |
|---|---|---|---|
| 5,416,623 A * | 5/1995 | Dawson | G01M 11/3118 398/16 |
| 5,960,000 A * | 9/1999 | Ruszczyk | H04L 12/2801 370/447 |
| 5,986,972 A * | 11/1999 | Li | H04B 7/0671 367/13 |
| 6,438,603 B1 | 8/2002 | Ogus | |
| 6,717,922 B2 | 4/2004 | Hsu et al. | |
| 6,771,673 B1 | 8/2004 | Baum et al. | |
| 7,106,971 B1 * | 9/2006 | Davis | H04B 10/112 398/121 |
| 7,171,500 B2 | 1/2007 | Day et al. | |
| 7,173,690 B2 | 2/2007 | Haran | |
| 7,240,912 B2 | 7/2007 | Whyte | |
| 7,295,509 B2 * | 11/2007 | Laroia | H04L 5/023 370/208 |
| 7,330,245 B2 | 2/2008 | Froggatt | |
| 7,334,042 B2 | 2/2008 | Day et al. | |
| 7,415,477 B2 | 8/2008 | Devadas et al. | |
| 7,614,045 B2 | 11/2009 | Kuck et al. | |
| 7,706,284 B2 | 4/2010 | Suemura | |
| 7,724,760 B2 | 5/2010 | Balakrishnan et al. | |
| 7,885,539 B2 | 2/2011 | Leppla et al. | |
| 7,990,850 B2 | 8/2011 | Stokes et al. | |
| 8,046,577 B2 | 10/2011 | Henry et al. | |
| 8,255,575 B2 | 8/2012 | Sakurai | |
| 8,467,289 B2 | 6/2013 | Kini et al. | |
| 8,549,413 B2 | 10/2013 | Balasubramanian et al. | |
| 8,573,364 B2 | 11/2013 | Fang et al. | |
| 8,588,230 B1 | 11/2013 | Smith et al. | |
| 8,588,280 B2 | 11/2013 | Oh et al. | |
| 8,634,322 B2 | 1/2014 | Bryant et al. | |
| 8,705,346 B2 | 4/2014 | Wang et al. | |
| 8,738,960 B2 | 5/2014 | Wei et al. | |
| 8,782,195 B2 | 7/2014 | Foti | |
| 8,797,849 B2 | 8/2014 | Stokes et al. | |
| 8,838,681 B2 | 9/2014 | Motes et al. | |
| 8,949,449 B2 | 2/2015 | Zuckerman et al. | |
| 8,964,546 B1 | 2/2015 | Jain et al. | |
| 8,964,566 B2 | 2/2015 | White et al. | |
| 9,111,110 B2 | 8/2015 | Subramani et al. | |
| 9,213,588 B2 | 12/2015 | Nair et al. | |
| 9,247,481 B2 | 1/2016 | Joo | |
| 2005/0002017 A1 | 1/2005 | Haran | |
| 2006/0204165 A1 | 9/2006 | Froggatt | |
| 2007/0002310 A1 * | 1/2007 | Chen | G01M 11/3181 356/73.1 |
| 2007/0274712 A1 | 11/2007 | Leppla et al. | |
| 2009/0244522 A1 * | 10/2009 | Cyr | G01M 11/3181 356/73.1 |
| 2012/0014690 A1 * | 1/2012 | Gruber | H04B 10/071 398/25 |
| 2012/0070036 A1 * | 3/2012 | Lee | G06K 9/00375 382/103 |
| 2012/0224741 A1 * | 9/2012 | Edwards | H04R 3/00 382/100 |
| 2013/0222811 A1 * | 8/2013 | Handerek | G01M 11/3127 356/477 |
| 2014/0078506 A1 * | 3/2014 | Hu | G01M 11/3118 356/445 |
| 2016/0123837 A1 * | 5/2016 | Chen | G01M 11/088 356/73.1 |
| 2016/0187224 A1 * | 6/2016 | Chen | H04B 10/07955 356/73.1 |

OTHER PUBLICATIONS

Colle et al, SRLG Identification From Time Series Analysis of Link State Data, Conference Paper, 2011, Research Gate, Belgium.

* cited by examiner

METHOD AND APPARATUS FOR DETECTING SHARED RISK LINK GROUPS

CROSS-REFERENCE TO RELATED APPLICATION

This application claims priority to Chinese Patent Application No. 201510083681.7, filed on Feb. 16, 2015, which is incorporated herein by reference in its entirety.

TECHNICAL FIELD

The embodiments of the present invention relate generally to the field of optical network-based communication technology and, more particularly, to a method and apparatus for detecting shared risk link groups.

BACKGROUND

With the consistent growth of optical network-based communication techniques, different kinds of optical network services have continued to emerge, such as cloud computing, video on demand, wavelength leasing, optical layer virtual private networks (OVPN), and the like. While these novel network services bring convenience to people's lives, stricter demands regarding the reliability of these services are also being introduced. In order to increase the reliability of optical network services, backup routes are usually set in addition to the main routes in an optical network. When there is a problem with a main route in an optical network, the optical network services on the main route can be switched over to the backup route to maintain normal operation of those services.

In recent years, the concept of a shared risk link group (SRLG) has usually been employed when evaluating the reliability of the optical network. An SRLG represents a group of links that share a certain physical resource in an optical network, such as a group of links that share the same node or the same cable. When that physical resource is damaged, the group of links which share this physical resource will break down. For example, assuming a group of links is laid in the same cable, if that cable is damaged, those links in the group will simultaneously break down.

If both the main route and the backup route in the optical network are located in the same SRLG, then if a physical resource of that SRLG is damaged, there will be failures on both the main and backup routes at the same time. Hence, it is essential to detect the SRLGs in an optical network to make sure that the main route and the corresponding backup route are allocated to different SRLGs.

Conventional techniques for detecting SRLGs usually use an instrument having a polarization detecting function to detect polarization characteristics of optical links. In accordance, when the polarization characteristics of two optical links are the same, those two optical links will be considered to be in the same SRLG.

However, these conventional techniques all have problems. For instance, the polarization characteristic of an optical signal has a three-dimensional component. In applications, it is often difficult to test and analyze the three-dimensional component. Hence, it is difficult to implement a method based on judging whether links in the same group are in the same SRLG based on the polarization characteristics of the optical links. A new approach is required.

SUMMARY

An embodiment of the present invention is to provide a method and device for detecting shared risk link groups that can readily detect whether test links of a group are in the same shared risk link group. According to the embodiments of the present invention, methods and devices are introduced for detecting shared risk link groups by testing a power characteristic of the backlight of a probe beam in test links and, based on that one-dimensional power characteristic, judging or determining whether the test links are in the same shared risk link group. Compared to a three-dimensional component used in conventional techniques, tests using a one-dimensional component are relatively easier. The embodiments of the present invention introduce methods and devices for detecting whether a test link is in a shared risk link group based on a one-dimensional power characteristic, which is simpler in application than conventional techniques.

More specifically, in an embodiment of the present invention, a method for detecting shared risk link groups includes injecting a probe beams, respectively, into a first test link and a second test link. The method further includes receiving a first backlight and a second backlight of the probe beam returned from the first test link and the second test link respectively. Herein, Rayleigh backscattered light and Fresnel back-reflected light are collectively referred to as backlight. The method also includes the following: recording, respectively, a first curve of a time-varying first power corresponding to the first backlight and a second curve of a time-varying second power corresponding to the second backlight; calculating a resemblance value for the first curve and the second curve; and judging, based on the resemblance value, whether the first test link and the second test link are located in the same shared risk link group.

In another embodiment of the present invention, a device for detecting shared risk link groups includes a light source unit, a transmit/receive unit, an information recording unit, and an information processing unit. The light source unit generates a probe beam and injects the probe beam into the transmit/receive unit. The transmit/receive unit receives the probe beam generated by the light source unit, injects the probe beam into a first test link and a second test link, and receives a first backlight and a second backlight of the probe beam returned from the first test link and the second test link respectively. The information recording unit records a first curve of a time-varying first power corresponding to the first backlight and a second curve of a time-varying second power corresponding to the second backlight. The information processing unit calculates a resemblance value for the first curve and the second curve and judges, based on the resemblance value, whether the first and second test links are in the same shared risk link group.

In another embodiment of the present invention, a device for detecting shared risk link groups includes a light source unit, a transmit/receive unit, and a mapping unit. The light source unit generates a probe beam and injects the probe beam into the transmit/receive unit. The transmit/receive unit receives the probe beam generated by the light source unit, injects the probe beam into a first test link and a second test link, and receives a first backlight and a second backlight of the probe beam returned from the first test link and the second test link respectively. The mapping unit maps polarization characteristics of the first backlight and the second backlight received by the receiving module as a first power and a second power respectively.

In another embodiment of the present invention, a device for detecting shared risk link groups is disclosed and has an information recording unit and an information processing unit. The information recording unit records a first curve of a time-varying first power corresponding to the first backlight and a second curve of a time-varying second power corresponding to the second backlight. The information processing unit calculates a resemblance value for the first curve and the second curve and judges, based on the resemblance value, whether a first test link and a second test link are in the same shared risk link group.

The method and device for detecting shared risk link groups provided by embodiments of the present invention perform detection by testing a power characteristic of the backlight of a probe beam in test links and, based on that one-dimensional power characteristic, judge whether the test links are in the same shared risk link group. In comparison to testing using a three-dimensional component in conventional techniques, tests using a one-dimensional component are relatively easier to perform. Embodiments of the present invention introduce a method and device for detecting whether a test link is in a shared risk link group based on a one-dimensional power characteristic, which is simpler in application than those used conventionally.

DETAILED DESCRIPTION

Figure 1:
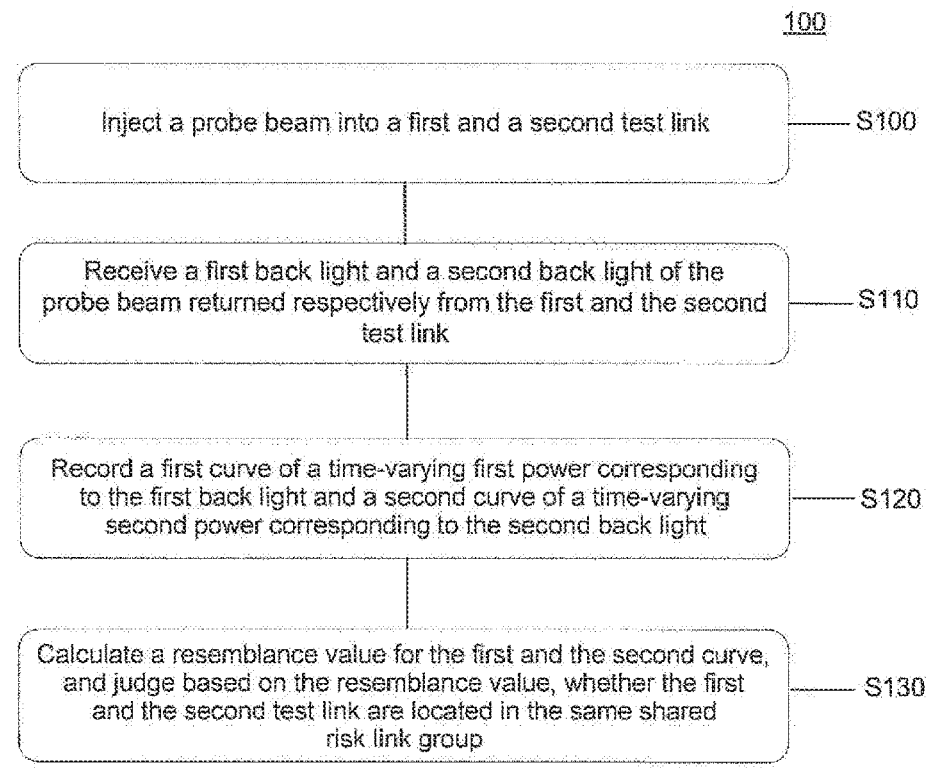
FIG. 1 is a flowchart of an exemplary method for detecting shared risk link groups in accordance with an embodiment of the present invention.

In order to help those skilled in the art to better understand the technical solution of the embodiments of the present invention, a clear and complete description of the technical solution as found in embodiments of the present invention will now be made in conjunction with references to the accompanying drawings. The embodiments described herein are obviously only a portion, not the entirety, of the embodiments of the present invention. Based on the embodiments of the present invention, all other embodiments obtained by a person skilled in the art without exerting any inventive effort ought to fall within the scope of protection of the present invention.

Optical fibers are usually the transmission medium for link groups in an optical network. During the manufacturing process of optical fibers, thermal processes such as sedimentation, fusion, and wiredrawing can introduce local thermal disturbances into the materials used to manufacture optical fibers, leading to uneven, refractive indexes in the optical fibers. These uneven, refractive indexes result in optical signal scattering in optical fibers during transmission, including left, right, forward and backward transmission during signal transmission. This phenomenon of optical signal scattering in optical fibers is called Rayleigh scattering. Furthermore, the scattering of light opposite to the forward direction of the optical signal is called Rayleigh backscattered light. Moreover, when the optical signal in forward transmission encounters a spot with an abrupt change in refractive index, a segment of the optical signal will be reflected back to the input terminal from that spot; this segment of the optical signal is called Fresnel back-reflected light. In embodiments of the present invention, both Rayleigh backscattered light and Fresnel back-reflected light are referred to as backlight. The backlight can be considered as optical signal loss during forward transmission in a link. In applications, it is difficult to directly measure the power of an optical signal in forward transmission in optical fibers. However, it is easier to measure the power of backlight returned to the input port of the optical fiber. In embodiments of the present invention, the power of backlight is used to characterize or determine the optical signal loss in forward transmission in a link. When the power of the backlight increases, it indicates that the optical signal loss in forward transmission is increasing, conversely, when the power of backlight decreases, it indicates that the optical signal loss in forward transmission is decreasing. In applications, environmental factors such as vibration from nearby construction may disturb optical fibers, which leads to changes in the refractive indexes of the optical fibers. The changes in refractive indexes result in changes in optical signal losses, which further leads to changes in the power of backlight Embodiments of the present invention use changes in the power of backlight to detect and reveal disturbances in the environment around the links.

FIG. 1 shows a flowchart of an exemplary method for detecting shared risk link groups in accordance with an embodiment of the present invention. The method is described to follow.

In S100, a probe beam is injected respectively into a first test link and a second test link.

Figure 2:
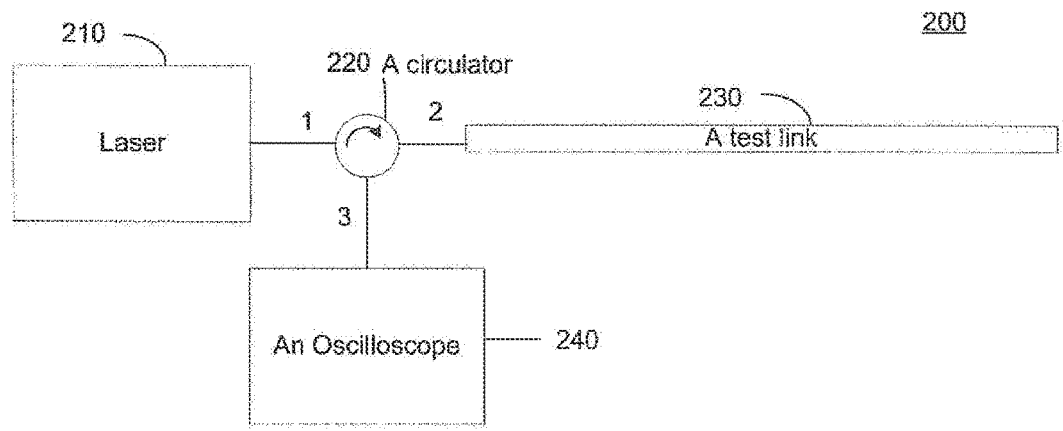
FIG. 2 is a block diagram of a device for testing a first test link in accordance with an embodiment of the present invention.

The method of FIG. 1 will be further explained using the first test link as an example. FIG. 2 illustrates a block diagram of a device for testing the first test link in accordance with an embodiment of the present invention. Refer to both FIG. 1 and FIG. 2. According to FIG. 2, laser 210 injects a probe beam into an input port of first test link 230 through circulator 220. In applications, there are usually optical signals used for transmitting communication services existed in a test link functioning as a communication link. The wavelengths of these proper functioning optical signals are usually around 1,550 nm. To avoid interfering with normal functions of the test links in communication services, embodiments according to the present invention use probe beams having a wavelength different from 1,550 nm, such as a probe beam having a wavelength of 1,650 nm, as an example. Thus, even though both the probe beam and the proper functioning optical signals are transmitting in the same test link, they have little influence on each other because of a relatively large wavelength interval between them. After the probe beam is injected into port 1 of circulator 220, it is exported from port 2 and enters first test link 230.

In S110 of FIG. 1, a first backlight of the probe beam is returned from the first test link and then received. In a similar manner, a second backlight of the probe beam is returned from a second test link (not shown) and then received.

More specifically, when the probe beam is transmitting forward in the first test link, it generates backlight in the first test link. The backlight includes Rayleigh backscattered light and Fresnel back-reflected light. The backlight returns to the injection port of the first test link through backward transmission. Specifically, as shown in FIG. 2, the backlight is transmitted backward in first test link 230 to port 2 of circulator 220. The backlight is exported from port 3 after entering port 2 of the circulator. In an embodiment of the present invention, testing instruments such as oscilloscope 240, for instance, can be used to receive the backlight exported from port 3 of the circulator.

In S120 of FIG. 1, a first curve of a time-varying first power corresponding to the first backlight is recorded. In a similar manner, a second curve of a time-varying second power corresponding to the second backlight can be recorded.

According to an embodiment of the present invention, test instruments such as oscilloscope 240, for instance, can be used to display the changes in the power of the backlight over time to obtain the first and second curves mentioned above.

Figure 3:
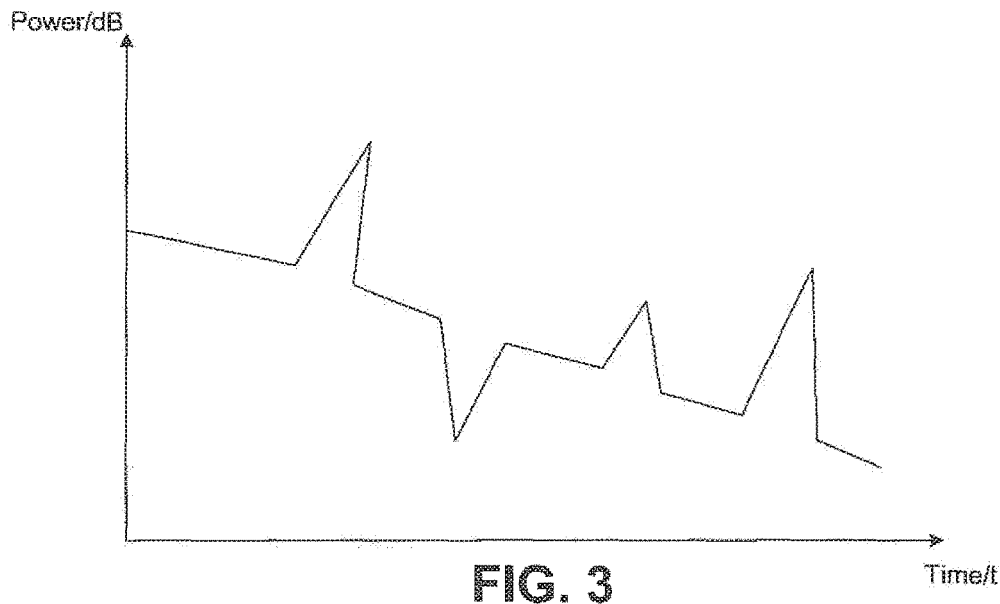
FIG. 3 is a schematic drawing of an example of a first curve of a time-varying first power corresponding to the first backlight in accordance with an embodiment of the present invention.

FIG. 3 is a diagram of a first curve of a time-varying first power corresponding to the first backlight in accordance with an embodiment of the present invention. In FIG. 3, if the first test link is interfered with by, for example, environmental factors, the power of backlight changes abruptly and, consequently, the graph of the power of the backlight changes over time to generate a wave crest. It can be observed that, in the example of FIG. 3, there are three wave crests and a wave trough, which means there were four disturbances that affected the first test link during the detection of the first test link. The time points where the wave crests and troughs occur in the first curve represent the respective points in time when these disturbances occurred.

In an embodiment of the present invention, an optical time domain reflectometer, which is a relatively well known instrument used in conventional techniques, can be adopted to implement Steps S100 to S120 of FIG. 1.

Figure 4:
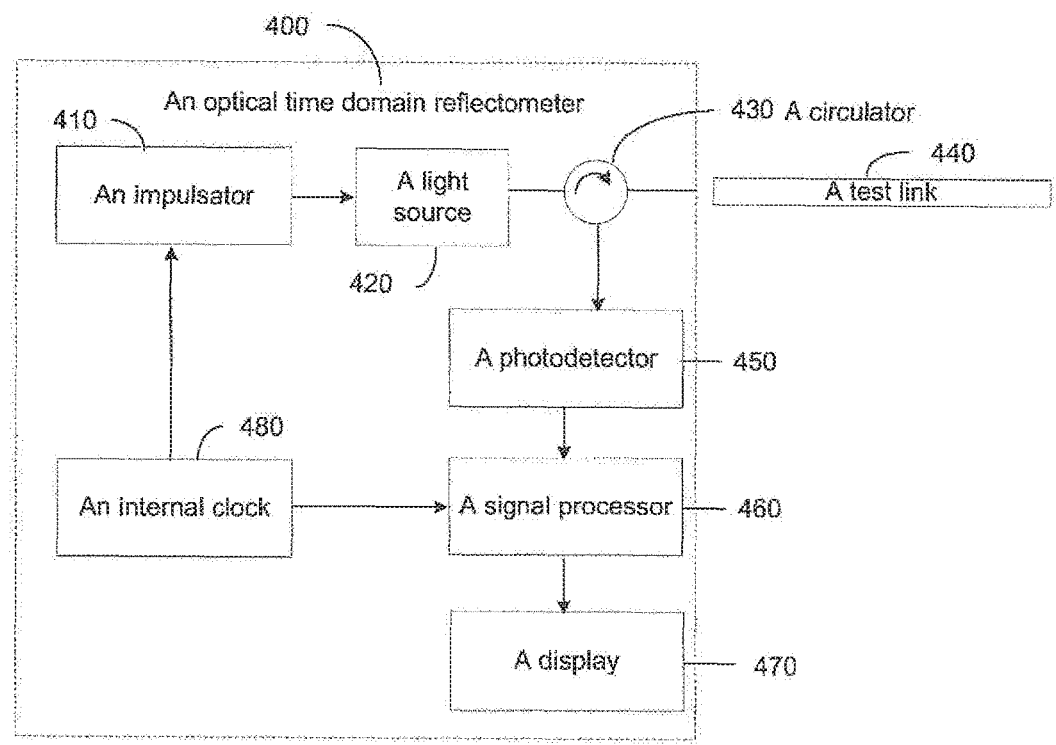
FIG. 4 is a block diagram of an optical time domain reflectometer recording the first curve in accordance with an embodiment of the present invention.

FIG. 4 is a schematic drawing of optical time domain reflectometer 400 that can be used to record the aforementioned first curve in accordance with an embodiment of the present invention. In the example of FIG. 4, optical time domain reflectometer 400 integrates pulse generator 410, light source 420 (for example, laser 210 of FIG. 2), circulator 430 (corresponding in function to circulator 220 of FIG. 2), photodetector 450, signal processor 460, display 470, and internal clock 480. Pulse generator 410 of optical time domain reflectometer 400 generates an electrical pulse triggered by the internal clock 480. The electrical pulse modulates light source 420 to generate an optical pulse. That optical pulse can serve as the probe beam mentioned in S100 in FIG. 1, in one embodiment. The probe beam is exported from port 2 of circulator 430 after entering port 1 (not shown) and injected into test link 440 (corresponding in function to test link 230 of FIG. 1).

The optical pulse produces backlight when transmitted forward along first test link 440. The backlight includes Rayleigh backscattered light and Fresnel back-reflected light. The backlight returns to the injection port of first test link 440 by backward transmission. Specifically, the backlight is transmitted backward in the first test link to port 2 of circulator 430. The backlight is exported from port 3 after entering port 2 of the circulator. Photodetector 450 can detect an electrical pulse from the backlight exported from port 3 of the circulator and transmit that electrical pulse to signal processor 460. The signal processor 460 then processes signals corresponding to the electrical pulses triggered by internal clock 480 to obtain a relationship of the changes in the electrical pulses over time. Finally, display 470 displays the first curve of a time-varying first power corresponding to the first backlight in the first test link (for example, the curve in the example of FIG. 3). In a similar manner, a second curve can be recorded of a time-varying second power corresponding to the second backlight in a second test link.

In S130 of FIG. 1, a similarity or resemblance value between the first curve and the second curve is calculated, and that resemblance value is used to determine whether the first test link and the second test link are located in the same shared risk link group.

Figure 20:
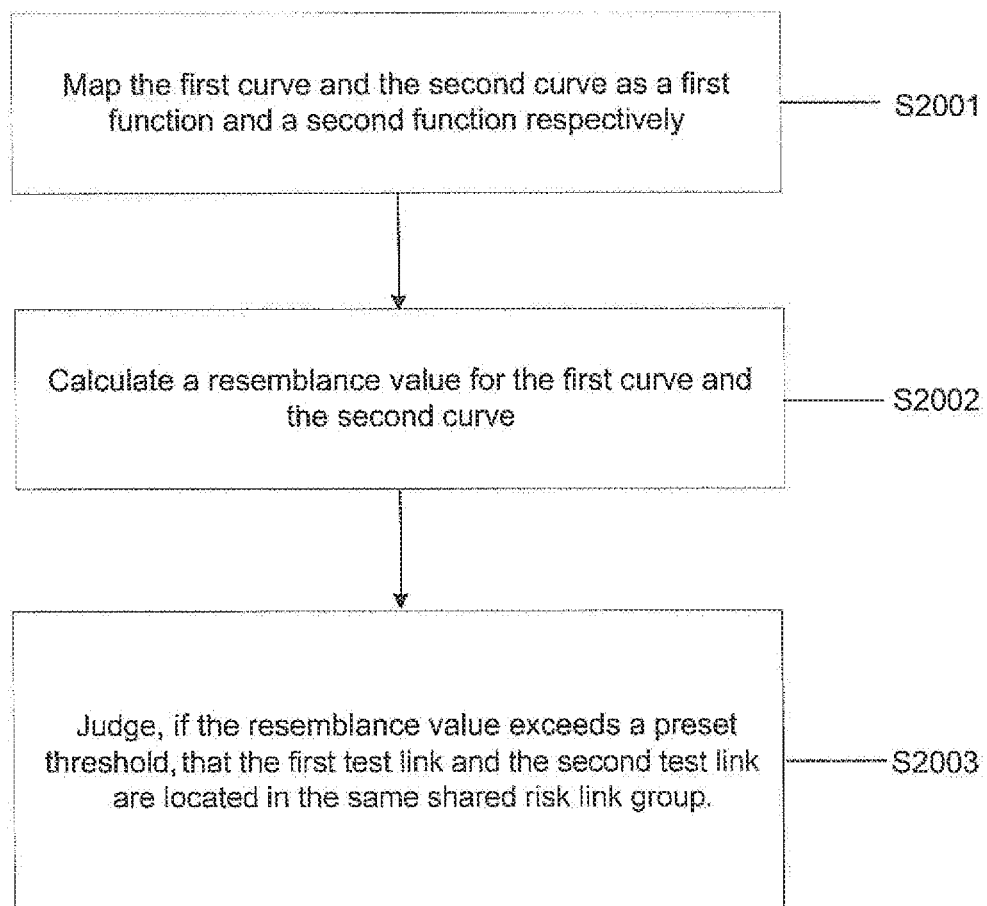
FIG. 20 is a flowchart of an exemplary method for detecting shared risk link groups in accordance with an embodiment of the present invention.

After the first curve and the second curve are obtained, a resemblance value for the two curves can be calculated. The resemblance value represents a degree of similarity between the first curve and the second curve. For example, a higher degree of similarity means a greater resemblance in the degree to which the power of the backlight in the first test link and the power of the backlight in the second test link are being disturbed by the environment of the first test link and the second test link. This indicates a greater probability that the first and the second test links are located in the same shared risk link group. It is appreciated that the resemblance value can be used to determine whether the first test link and the second test link are in the same shared risk link group. An embodiment of an exemplary process for determining whether the first and second test links are located in the same shared risk link group is described as follows, with reference to FIG. 20.

In S2001, the aforementioned first and second curves are mapped as a first function and a second function respectively.

Taking the first curve as an example, after obtaining the first curve, the continuous timeline of the first curve can be transformed into discrete time points. For example, a timeline from zero to 100 seconds can be transformed, using 0.5 second time intervals, into 200 time points, 0.5, 1, 1.5, . . . , 100, on a discrete timeline. Based on that first curve, the power value of the backlight corresponding to each time point on the discrete timeline can be obtained, and a one-to-one correspondence between each time point and the power value at that time point can also be obtained. Such one-to-one correspondence between a time point and the power value at that time point is the aforementioned first function, as in the following formula:

$$y_1 = f_1(x), x = \Delta t, 2\Delta t, 3\Delta t, \ldots, N\Delta t$$

where x represents a discrete time point, $\Delta t$ represents a time interval between adjacent discrete time points, N represents the number of discrete time points, and $y_1$ represents a power value corresponding to a respective discrete time point in the first curve.

Using the same method, a second function can be obtained with the following formula:

$$y_2 = f_2(x), x = \Delta t, 2\Delta t, 3\Delta t, \ldots, N\Delta t$$

where x represents a discrete time point, $\Delta t$ represents a time interval between adjacent discrete time points, N represents the number of discrete time points, and $y_2$ represents a power value corresponding to a discrete time point in the second curve.

In S2002, a resemblance value between the first function and the second function is calculated.

After the first function and the second function are obtained, the resemblance value for the first and second functions can be calculated. The resemblance value represents a degree of similarity between the first curve and the second curve. A higher degree of similarity means a greater resemblance in the degree to which the power of the backlight in the first test link and the power of the backlight in the second test link are being disturbed by the environment of the first test link and the second test link. This indicates a greater probability that the first and the second test link are located in the same shared risk link group. In one embodiment, the formula for calculating the resemblance value is:

$$\rho = \frac{\sum_{1}^{N} (f_2(x) - \overline{f_1(x)})(f_2(x) - \overline{f_{2(x)}})}{\sqrt{\sum_{1}^{N} (f_1(x) - (\overline{f_1(x)}))^2 \cdot \sum_{1}^{N} (f_2(x) - \overline{f_2(x)})^2}}, x = \Delta t, 2\Delta t, 3\Delta t, \ldots, N\Delta t$$

where $\rho$ represents a resemblance value for the first curve and the second curve, x represents a discrete time point, $\Delta t$ represents a time interval between adjacent discrete time points, N represents the number of discrete time points, $f_1$ represents a power value of the backlight corresponding to a discrete time point in the first curve, and $f_2$ represents a power value of the backlight corresponding to a discrete time point in the second curve.

In S2003, the first test link and the second test link are determined to be located in the same shared risk link group if the resemblance value exceeds a preset threshold.

More specifically, in an embodiment of the present invention, an exemplary threshold is predetermined or preset. By comparing the resemblance value with the threshold, it can be determined whether the first test link and the second test link are in the same shared risk link group. In applications, measuring errors are inevitable; therefore, there may be errors present when measuring the first curve and the second curve, which can lead to a lower resemblance value being calculated. Moreover, because there are intrinsic differences in materials used for manufacturing individual optical fibers, the first and second test links would be expected to have different sensitivities to environmental disturbances. For example, the vibration introduced by a passing car may not cause optical power loss in the first test link; however, it may cause optical power loss in the second test link. These types of differences can make the calculated resemblance value lower than expected. To take factors such as those described above into consideration, an embodiment of the present invention sets the threshold for comparing the resemblance value to a value of 0.75 (for instance). When the resemblance value exceeds the threshold of 0.75, the first test link and the second test link are considered to be located in the same shared risk link group. Of course, any suitable preset value could be used.

In another embodiment of the present invention, the following steps can be executed to embody Step S130 illustrated in FIG. 1.

Figure 21:
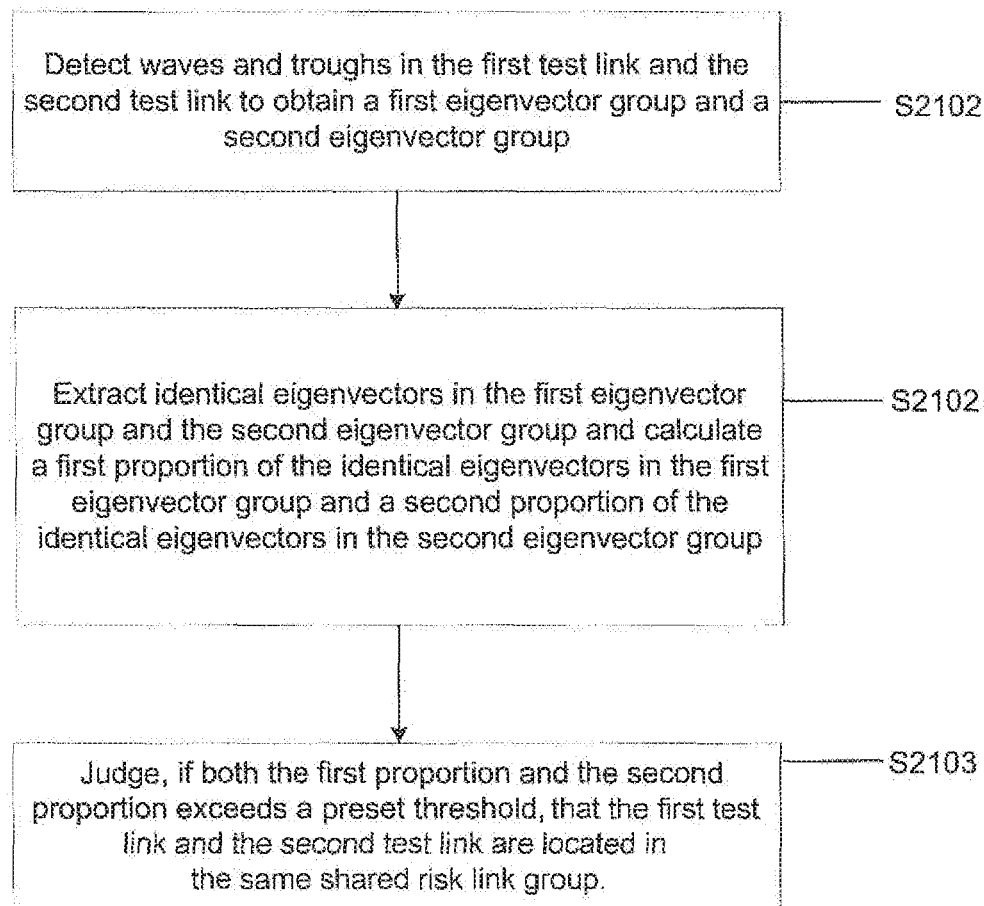
FIG. 21 is a flowchart of an exemplary method for detecting shared risk link groups in accordance with an embodiment of the present invention.

In S2101 of FIG. 21, wave crests and troughs in the first curve and the second curve are detected to obtain a first eigenvector group for the first curve and a second eigenvector group for the second curve.

Taking the first curve of FIG. 3 as an example, if the first test link is disturbed by environmental factors as previously described herein, then there will be a wave crest or a trough generated at the time point corresponding to the disturbance. An embodiment of the present invention detects the wave crests and troughs of the first curve and the second curve to obtain a first eigenvector group for the first curve and a second eigenvector group for the second curve respectively. The eigenvectors in those eigenvector groups can be presented as a representative value for the wave crest or trough and the time point where the wave crest or trough is generated.

In an embodiment of the present invention, the value representing a wave crest is one (1), the value representing a wave trough is zero (0), and the time point where the wave crest or trough is generated is expressed in units of seconds.

Specifically, assuming there is a wave trough generated at the tenth second in the first curve, then, after the trough is detected, the event corresponding to that wave trough at that time point can be represented by an eigenvector group (0, 10). After the detection of the wave crests and troughs of the first curve, the events corresponding to those wave crests and troughs and their respective time points can be represented by a series of eigenvector groups or eigenvectors. For example, if the first eigenvector group is (1, 5), (0, 7), and (1, 15), then it indicates that there is a wave crest at the fifth second, a wave trough at the seventh second, and a wave crest at the fifteenth second. In this way, the first eigenvector group and the second eigenvector group of the first curve and the second curve respectively can be obtained.

In S2102, identical eigenvectors in the first and second eigenvector groups are extracted, and a first proportion of the first eigenvector group that is made up of the identical eigenvectors and a second proportion of the second eigenvector group that is made up of the identical eigenvectors are calculated.

More specifically, after the first and second eigenvector groups of the first and second curves respectively are obtained, identical eigenvectors can be extracted from the first and second eigenvector groups. It is appreciated that these identical eigenvectors represent a degree of resemblance between the first test link and the second test link. After the identical eigenvectors in the first and second eigenvector groups are extracted, a first proportion of the first eigenvector group that is made up of the identical eigenvectors and a second proportion of the second eigenvector group that is made up of the identical eigenvectors can be calculated. The first proportion and the second proportion can be used to represent the resemblance value referred to in the foregoing. When both the first and second proportions are higher than a preset threshold, then the environments of the first test link and the second test link are similar, and the possibility that these two test links are in the same shared risk link group is high.

In S2103, the first test link and the second test link are considered to be in the same shared risk link group if both the first and the second proportions exceed a predetermined or preset threshold.

In an embodiment of the present invention, there is a preset threshold used as an example. By comparing the first proportion and the second proportion with that threshold, a determination can be made with regard to whether the first test link and the second test link are in the same shared risk link group. In applications, due to the intrinsic diversity of the materials used to manufacture the optical fibers of the test links, the sensitivities of the test links to environmental disturbances would be expected to be different. For example, the vibration introduced by a passing car may not cause a change in the optical polarization characteristic in the first test link; however, it may cause a change in the optical polarization characteristic in the second test link. Thus, different wave crests and troughs can be generated by the first and second test links, which leads to differences between the first eigenvector group and the second eigenvector group that can result in lower values for the calculated proportions. Based on the circumstances described above, in an embodiment of the present invention, the threshold of the proportions is set at 0.75 (for instance). Of course, any suitable value could be used. When both the first proportion and the second proportion exceed 0.75, then the first and the second test links are considered to be in the same shared risk link group.

Figure 5:
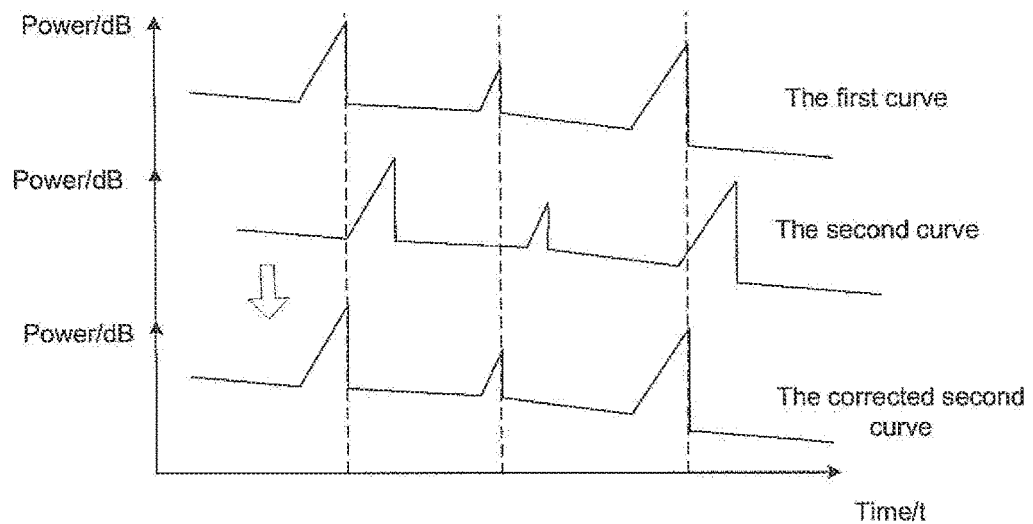
FIG. 5 is a schematic diagram showing the delay first curve and second curve in accordance with an embodiment of the present invention.
Figure 22:
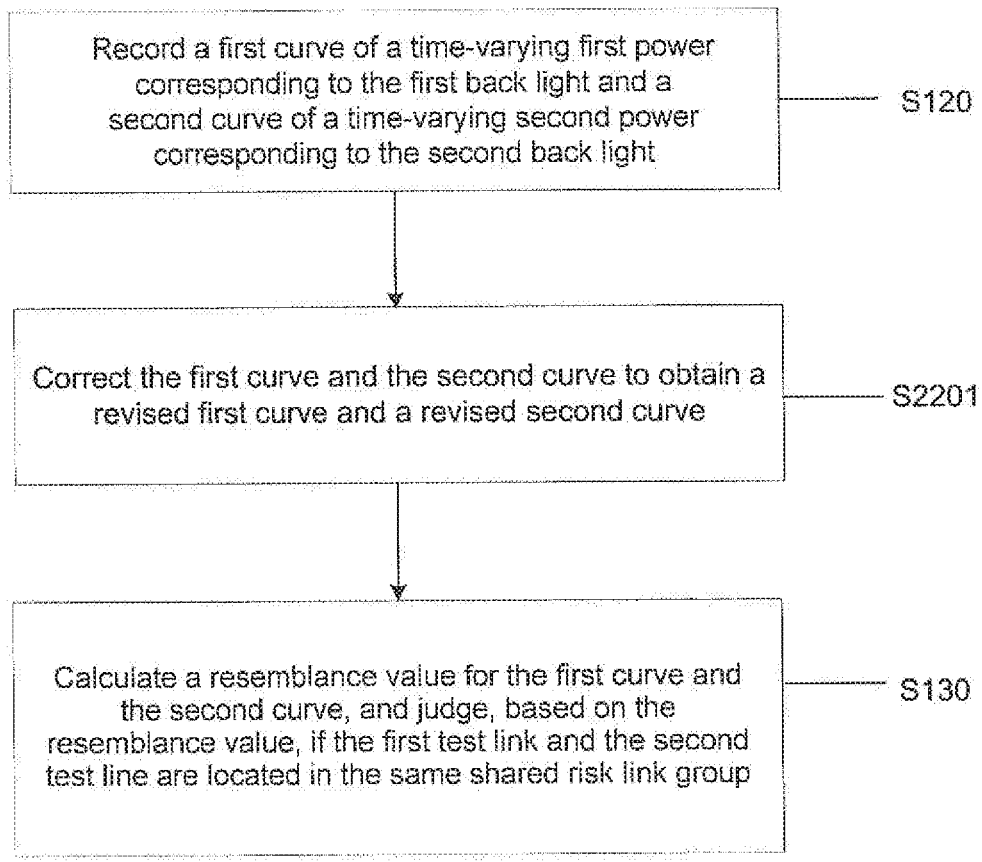
FIG. 22 is a flowchart of an exemplary method for detecting shared risk link groups in accordance with an embodiment of the present invention.

Due to measuring errors during measurement and delays introduced by the testing instruments, there can be a delay between the first and second curves. FIG. 5 is a schematic diagram illustrating a delay between the first and second curves in an embodiment of the present invention. In FIG. 5, it can be observed that the trends of the first and second curves are similar. For example, they both have three wave crests, and after aligning the first wave crest on the first curve with the first wave crest on the second curve, the time points of the subsequent two wave crests are consistent. Based on this, the delay between the first curve and the second curve displayed in FIG. 5 can be determined to have resulted from errors during measurement and delays in testing instruments. If there is not a correction step for correcting the delays between the first curve and the second curve, and instead a resemblance value is calculated directly, then the wrong conclusion would be that the first test link and the second test link are not in the same shared risk link group. This result is obviously is not correct given the resemblance between the two curves. Therefore, in an embodiment of the present invention, the following step is added between Steps S120 and S130 of FIG. 1, as shown in FIG. 22.

In S2201, the first curve and the second curve are corrected by time delay calibration to obtain a corrected or revised first curve and a corrected or revised second curve.

Specifically, in an embodiment of the present invention, the time point where the first event occurs in the first curve is aligned with the time point where the first event occurs in the second curve in order to correct the delay. The time points where events occur correspond to the time points where wave crests and troughs appear. In particular, the time point where the first event occurs in the first curve and the time point where the first event occurs in the second curve are obtained and set as the same time point. For example, assuming the time point where the first event occurs in the first curve is at the fifth second, and the time point where the first event occurs in the second curve is at the tenth second, then a common time point can be set, for example, at the fifth second, for the first event in both the first curve and the second curve. After such correction, the first curve is not affected, but the timeline of the second curve needs to be shifted five seconds earlier (as in 10−5=5) according to the foregoing. Therefore, the time points where the first events occur are the same in both the first curve and the second curve after the correction to the first and second curves; the subsequent calculations are similar to those described above.

Figure 6:
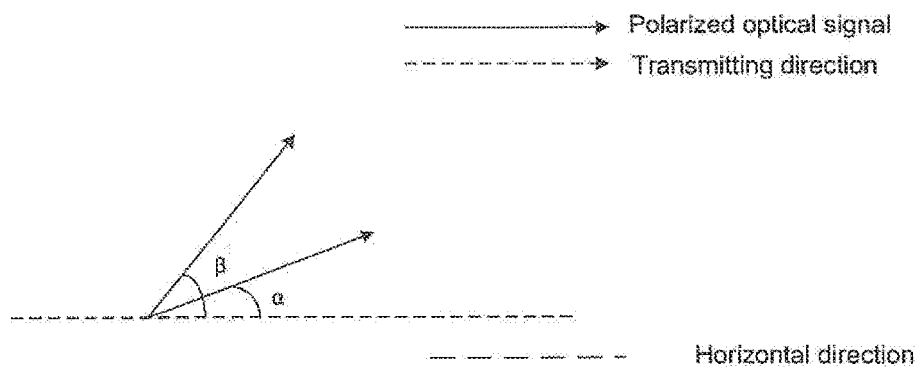
FIG. 6 is a schematic drawing showing changes in the polarization characteristic of an optical signal in accordance with an embodiment of the present invention.

In another embodiment of the present invention, taking environmental disturbances to the optical fibers into consideration, the polarization characteristics of the optical signals being transmitted in the optical fibers can be affected. Specifically, as shown in FIG. 6, the dashed line is in the horizontal direction. The horizontal angle between the initial polarized optical signal being transmitted forward along the optical fiber and the horizontal direction is $\alpha$. When the optical fiber is disturbed by environmental factors, the polarization characteristic of the optical signal changes, which results in the angle changing from $\alpha$ to $\beta$. The backlight transmitted in the optical fiber has the same polarization characteristic as the optical signal being transmitted forward. It is appreciated that when the polarization characteristic of the optical signal being transmitted forward changes because of environmental changes, the polarization characteristic of the backlight changes along with it. In an embodiment of the present invention, the polarization characteristic of the backlight is used to characterize the environmental factors around the optical signals. Because it is difficult to detect the polarization characteristic of the backlight directly, such an embodiment maps the polarization characteristic of the backlight as a one-dimensional power characteristic and moreover tests and analyzes the one-dimensional power characteristic to determine if the test links are in the same shared risk link group.

Figure 7:
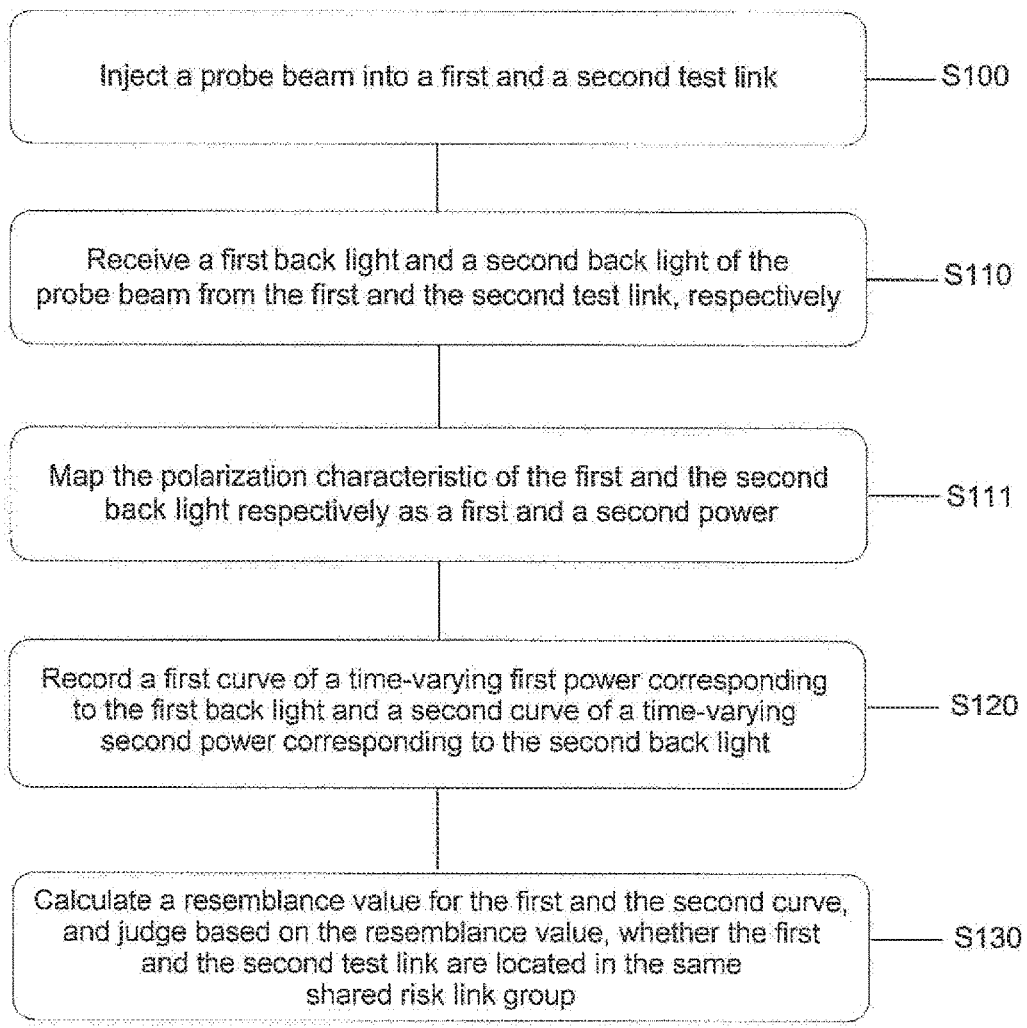
FIG. 7 is a flowchart of an exemplary method for detecting shared risk link groups in accordance with an embodiment of the present invention.

FIG. 7 is a flowchart of an exemplary method for detecting shared risk link groups in an embodiment of the present invention. As shown in FIG. 7, in addition to the steps illustrated in FIG. 1, the method further includes the following steps.

In S111, the polarization characteristics of the first backlight and the second backlight are mapped as a first power and a second power respectively.

Figure 8:
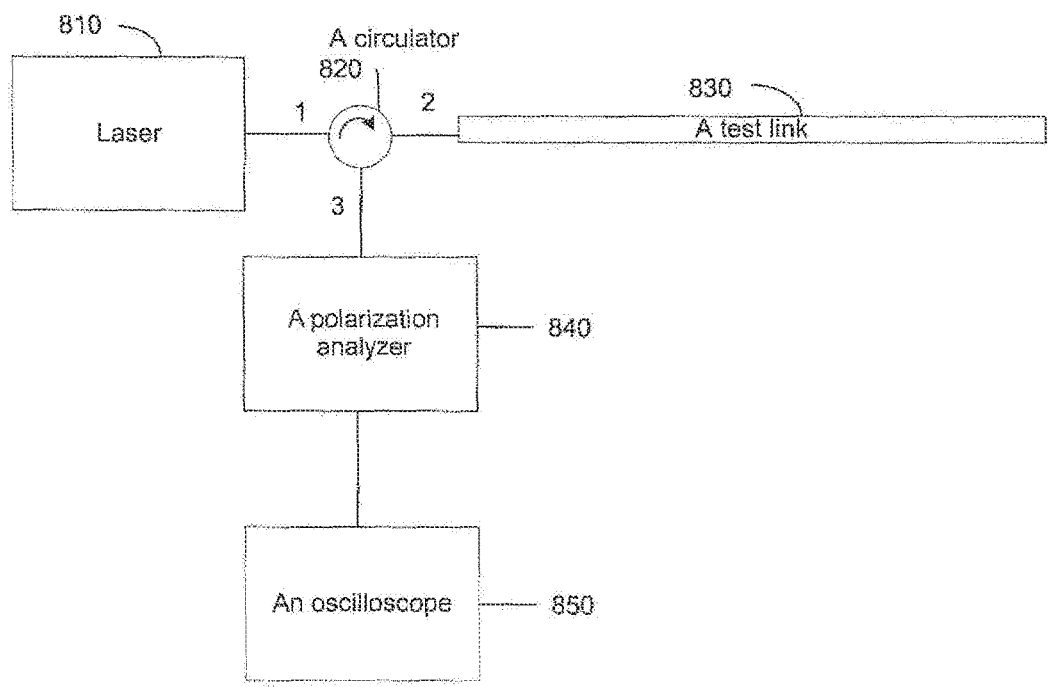
FIG. 8 is a block diagram of a device for mapping the polarization characteristic of backlight as a power characteristic according to preset rules in accordance with an embodiment of the present invention.

FIG. 8 is a block diagram of device 800 for mapping the polarization characteristic of backlight as a power characteristic according to a series of preset or predetermined rules in accordance with an embodiment of the present invention. As shown in FIG. 8, laser 810 injects a probe beam pulse into an injection port (port 1) of test link 830 through circulator 820.

When the probe beam is transmitted forward in a test link, it generates backlight in the test link. The backlight includes Rayleigh backscattered light and Fresnel back-reflected light. The backlight returns to the injection port of the test link through backward transmission. Specifically, the backlight is transmitted backward in the first test link to port 2 of circulator 820. The backlight is exported from port 3 after entering port 2 of circulator 820. The polarization characteristic of the backlight exported from port 3 of circulator 820 characterizes the environmental disturbances along test link 830. In an embodiment of the present invention, a certain direction is set using polarizer 840, and a projection of the polarization characteristic of the backlight mapped in that certain direction is set as the power characteristic of the backlight.

Figure 19:
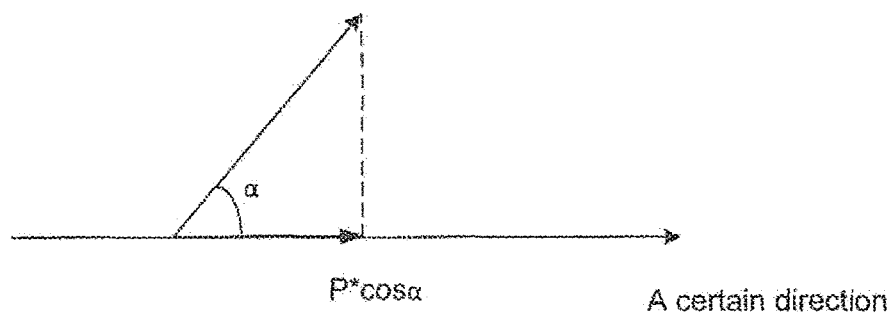
FIG. 19 is a diagram illustrating attributes of light operated on a polarization analyzer in accordance with an embodiment of the present invention.

FIG. 19 is a diagram illustrating attributes of light operated on by a polarizer (for example, polarizer 840 of FIG. 8). As shown in FIG. 19, the polarizer sets a direction (for example, the horizontal direction) as a designated direction, so that only the component of backlight in the designated direction can pass through the polarizer. Assuming the angle between the direction of the polarized backlight and the designated direction set by the polarizer is a and the power of the backlight is P, then after the backlight passes through the polarizer, only the component in the designated direction can pass through. The power of the backlight after passing through the polarizer can be expressed as Equation 1:

$$P_1 = P * \cos \alpha \quad \text{(Equation 1)}$$

where $P_1$ represents the power of the backlight after passing through the polarizer and $\alpha$ represents the angle between the direction of the polarized backlight and the designated direction set by the polarizer. It can be observed from Equation 1 that when the polarization characteristic of the backlight changes, the angle between the direction of the polarized backlight and the designated direction set by the polarizer changes with it, which leads to a change in the value of cos α and, finally, the power of the backlight after it passes through the polarizer changes as well. Therefore, it is appreciated that changes in the polarization characteristic of the backlight can be characterized by the changes in the power characteristic of the backlight. Furthermore, environmental disturbances around the test link can introduce changes in the polarization characteristic of the optical signal in the test link, which leads to changes in the power characteristic of the backlight after it passes through the polarizer. By monitoring the status of the changes of the power characteristic of the backlight after it passes through the polarizer, it can be determined whether there are environmental disturbances around the test link.

In an embodiment of the present invention, after the polarization characteristic of the backlight is mapped as the power characteristic, test instruments (for example, oscilloscope 850) can be used to receive the backlight after the backlight passes through the polarizer. Oscilloscope 850 displays real-time changes in the power of the backlight after the backlight passes through the polarizer over time and generates a curve tracing changes in the power of the backlight over time. In an embodiment of the present invention, a first curve tracing changes in the power of the backlight in the first test link over time and a second curve tracing changes in the power of the backlight in the second test link over time are recorded.

When the test link is disturbed by environmental factors (the polarization characteristic of the backlight changes and the angle between the direction of the polarized backlight and the direction set by the polarizer changes) this can lead to changes in the power of the backlight after it passes through the polarizer. The graph changes in the power of the backlight over time then has wave crests and troughs such as those shown in the example of FIG. 3.

Figure 9:
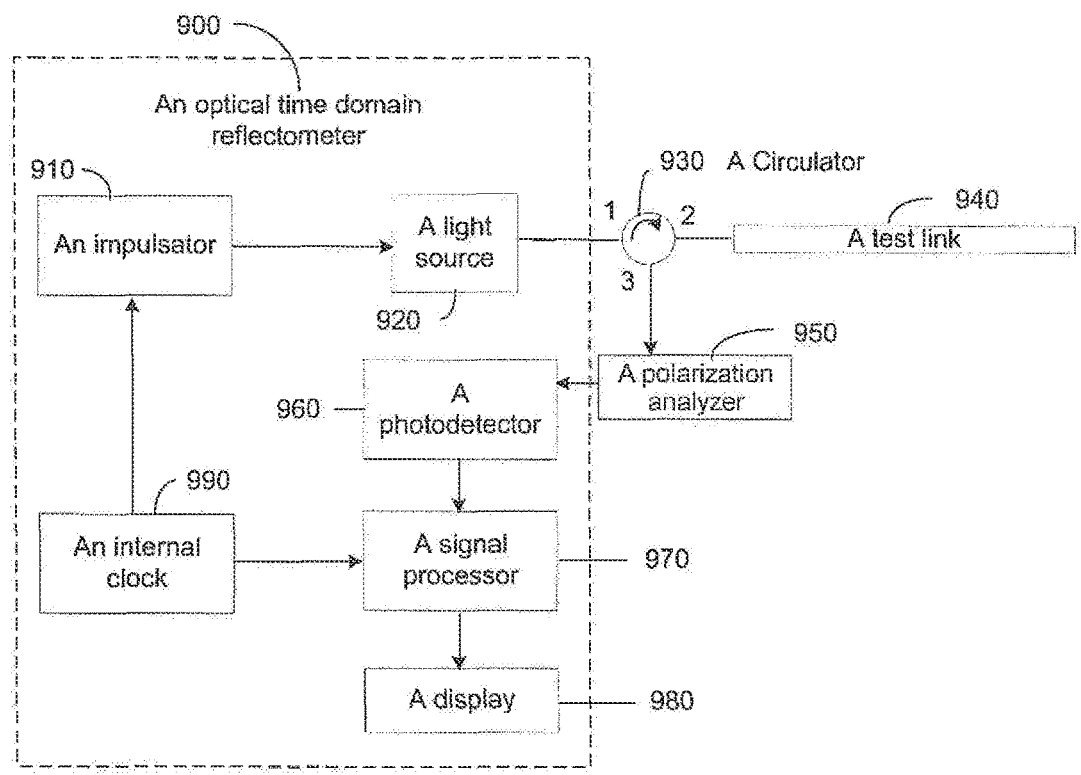
FIG. 9 is a block diagram of an optical time domain reflectometer recording the first curve in accordance with an embodiment of the present invention.

In another embodiment of the present invention, an optical time domain reflectometer can be used to record a first graph of changes in the power of the backlight in the first test link over time and to record a second graph of changes in the power of the backlight in the second test link over time. FIG. 9 is a block diagram of a device that can use an optical time domain reflectometer to record the first curve of the power of the backlight in the first test link over time in an embodiment of the present invention. In the example of FIG. 9, optical time domain reflectometer 900 includes pulse generator 910, light source 920, photodetector 960, signal processor 970, inner clock 990, and display 980. Pulse generator 910, in optical time domain reflectometer 900, generates an electrical pulse triggered by internal clock 990; that electrical pulse modulates light source 920 to generate an optical pulse. That optical pulse can serve as the probe beam mentioned in S100 in FIG. 1. The probe beam is exported from port 2 of circulator 930 after entering in port 1 and injected into first test link 940.

The optical pulse produces backlight when transmitted forward along the first test link. The backlight includes Rayleigh backscattered light and Fresnel back-reflected light. The backlight returns to the injection port of the first test link by backward transmission. Specifically, the backlight is transmitted backward in the first test link to port 2 of the circulator. The polarization characteristic of the backlight is substantially consistent with that of the probe beam. The backlight generated transmits backwards in the test link to return to the injection port of the test link. Specifically, the backlight is transmitted backwards in the test link and returns to port 2 of circulator 930. The backlight is exported from port 3 after entering port 2 of the circulator. The polarization characteristic of the backlight exported from port 3 of the circulator characterizes the environmental disturbances around test link 940. In an embodiment, polarizer 950 is used to set a certain direction and is set as the projection of the polarization characteristic of the backlight mapped in that direction as the power characteristic of that backlight.

Photodetector 960 can detect an electrical pulse from the backlight exported from port 3 of the circulator and provide that electrical pulse to signal processor 970. Signal processor 970 then processes the signals of the electrical pulses triggered by internal clock 990 to obtain a relationship between the changes in the electrical pulses over time. Finally, display 980 displays the first curve tracing changes in the power of the backlight in the first test link over time. The process of recording the second graph of the second power changes of the backlight over time is similar.

A resemblance value for the first curve and the second curve can be calculated and a determination can be made as to whether the first curve and the second curve are in the same shared risk link group based on that resemblance value in a manner similar to Step S130 in FIG. 1.

In an embodiment of the present invention, additional steps are added between Steps S120 and S130, as follows.

In S2201, the first curve and the second curve are corrected by time delay calibration to obtain a corrected first curve and a corrected second curve.

Figure 10:
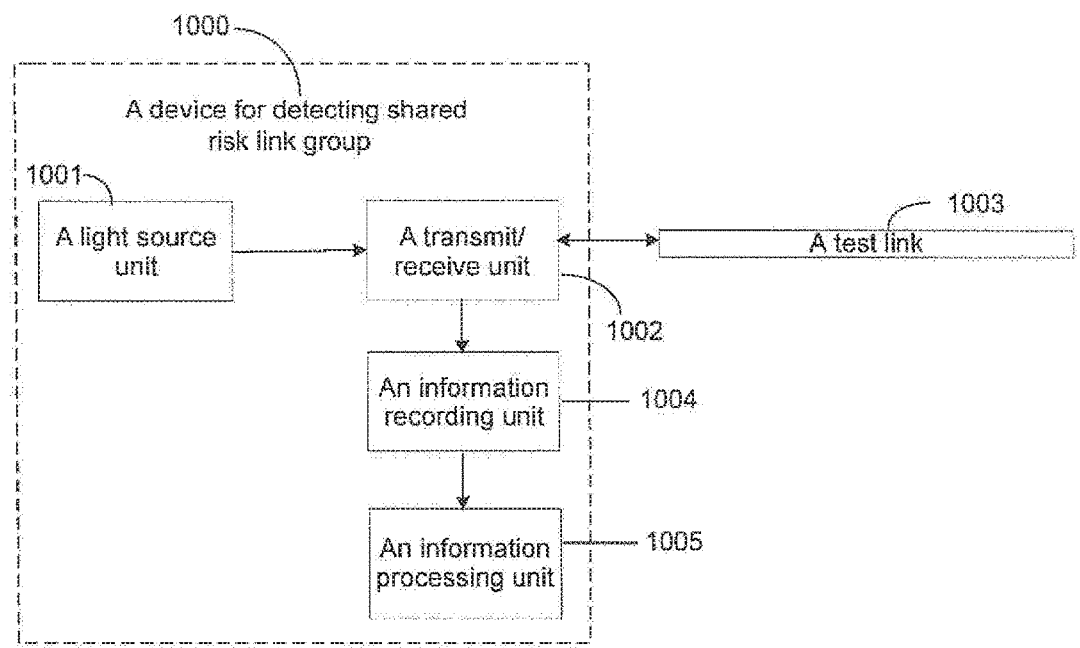
FIG. 10 is a block diagram of a device for detecting shared risk link groups in accordance with an embodiment of the present invention.

In an embodiment of the present invention, there is a device 1000 (FIG. 10) for detecting shared risk link groups. FIG. 10 is a block diagram of device 1000 for detecting shared risk link groups in an embodiment according to the present invention. As shown in the example of FIG. 10, the device includes light source unit 1001 used for generating a light beam and for injecting the light beam into receiving-sending unit 1002. The device further includes receiving-sending unit 1002 used for receiving the light beam generated by light source unit 1001, for injecting the light beam into a first test link and a second test link (both links are identified collectively as element number 1003). Receiving unit 1002 also is used for receiving first backlight of the light beam returned by the first test link and second backlight of the light beam returned by the second test link. The device also includes information recording unit 1004 used for recording a first curve graphing changes in a first power corresponding to the first backlight over time, and for recording a second curve graphing changes in a second power of the second backlight over time. The device also includes information processing unit 1005 used for calculating a resemblance value for the first and second curves and for determining, based on the resemblance value as previously described herein, whether the first test link and the second test link are located in the same shared risk link group. In an embodiment, the light source unit can be a laser and the receiving unit can be a circulator, for instance. The backlight of the light beam includes Rayleigh backscattered light and Fresnel back-reflected light.

Figure 11:
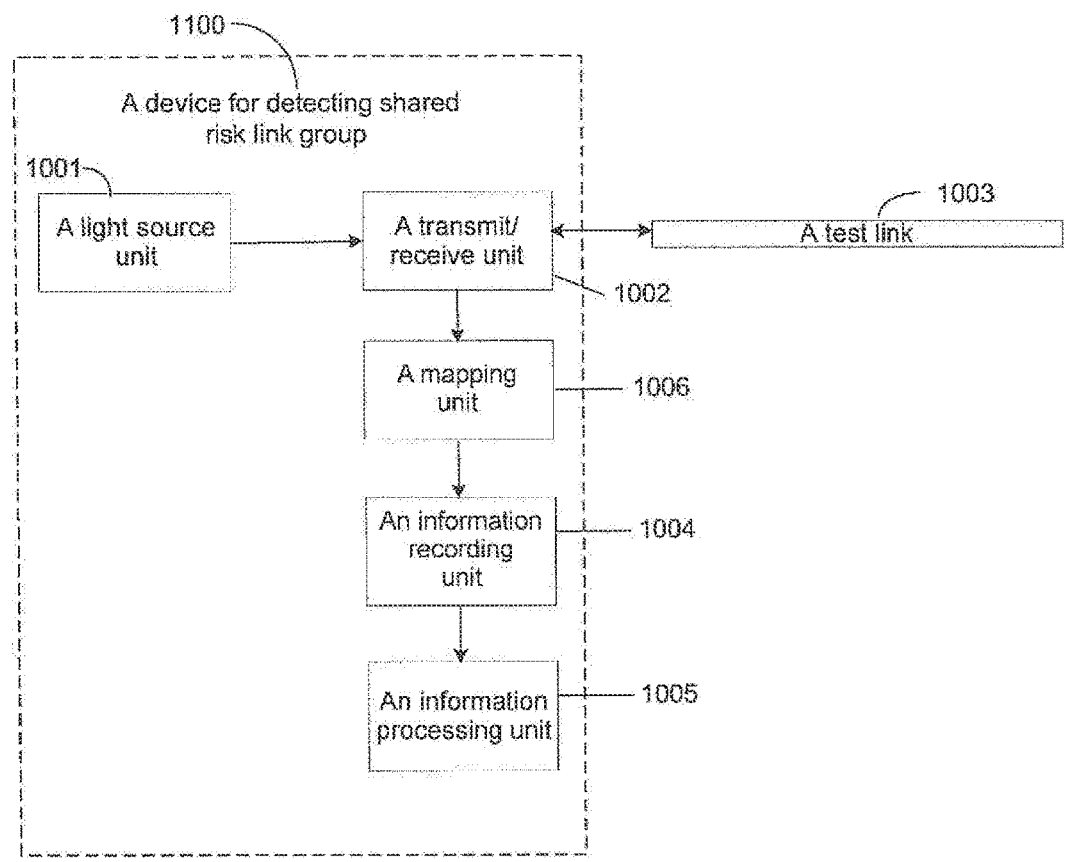
FIG. 11 is a block diagram of a device for detecting shared risk link groups in accordance with another embodiment of the present invention.

In another embodiment of the present invention, there is a device 1100 for detecting shared risk link groups. As shown in the example of FIG. 11, in addition to the blocks presented in FIG. 10, device 1100 also includes mapping unit 1006 used for mapping the polarization characteristic of the first backlight received by receiving unit 1002 as a first power and for mapping the polarization characteristic of the second backlight as a second power. In an embodiment, the light source unit can be a laser and the receiving module can be a circulator, for instance. The backlight of the light beam includes Rayleigh backscattered light and Fresnel back-reflected light.

Figure 12:
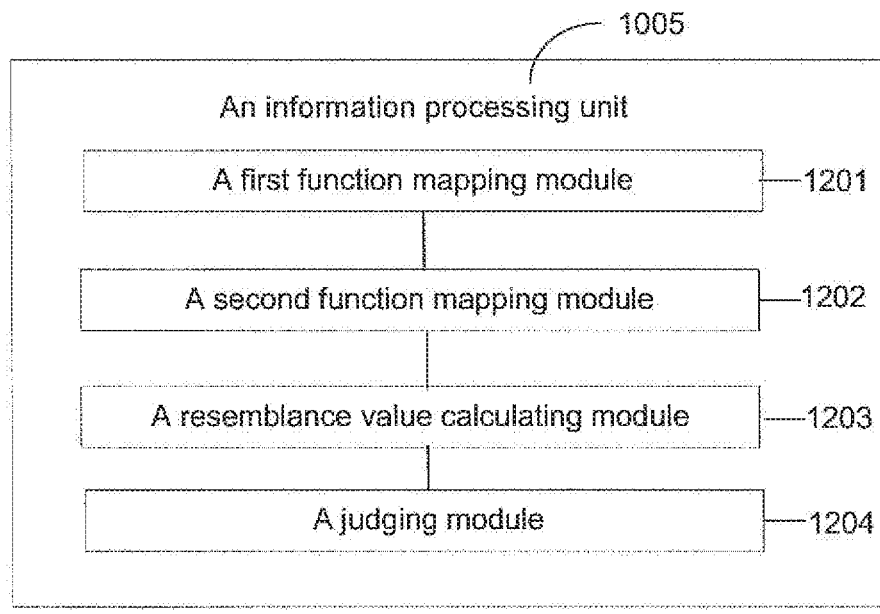
FIG. 12 is a block diagram of an information processing unit in a device for detecting shared risk link groups in accordance with an embodiment of the present invention.

FIG. 12 is a block diagram of a computer controlled information processing unit 1005 in a device for detecting shared risk link groups in an embodiment of the present invention. Information processing unit 1005 includes first function mapping module 1201 used for mapping the first curve as a first function and also includes second function mapping module 1202 used for mapping the second curve as a second function. Information processing unit 1005 further includes resemblance value calculating module 1203 used for calculating the resemblance value for the first function and the second function. Information processing unit 1005 also includes judgment or determination module 1204 used for judging, in accordance with the resemblance value as previously described herein, whether the first and the second test links are located in the same shared risk link group.

Figure 23:
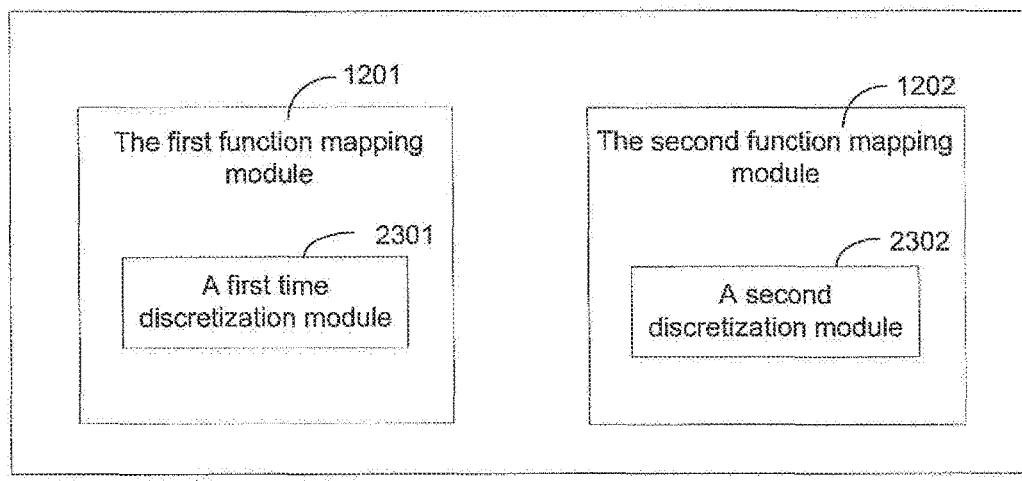
FIG. 23 is a block diagram of a first function mapping module and a second function mapping module in a device for detecting shared risk link groups in accordance with an embodiment of the present invention.

Furthermore, in an embodiment of the present invention, with reference to FIG. 23, includes first function mapping module 1201 which further includes first timeline discretization module 2301 used for mapping (according to a discrete timeline) the first curve as the first function. The associated second function mapping module 1202 further includes second timeline discretization module 2302 used for mapping (according to the discrete timeline) the second curve as the second function.

Moreover, in another embodiment of the present invention, information processing unit 1602 (FIG. 24) further includes a first eigenvector group obtaining module 2401 used for detecting wave crests and troughs of the first curve to obtain a first eigenvector group of the first curve. And also includes a second eigenvector group obtaining module 2402 used for detecting wave crests and troughs of the second curve to obtain a second eigenvector group of the second curve. Information processing unit 1602 also includes a first proportion obtaining module 2403 used for extracting identical eigenvectors from the first and the second eigenvector groups and for calculating a first proportion of the identical eigenvectors in the first eigenvector group. Information processing unit 1602 also includes a second proportion obtaining module 2404 used for extracting identical eigenvectors from the first and the second eigenvector groups and calculating a second proportion of the identical eigenvectors in the second eigenvector group. Information processing unit 1602 also includes a judging module 2405 used for judging, or determining, when both the first and the second proportion exceed a preset threshold, that the first and the second test link are located in the same shared risk link group.

Figure 13:
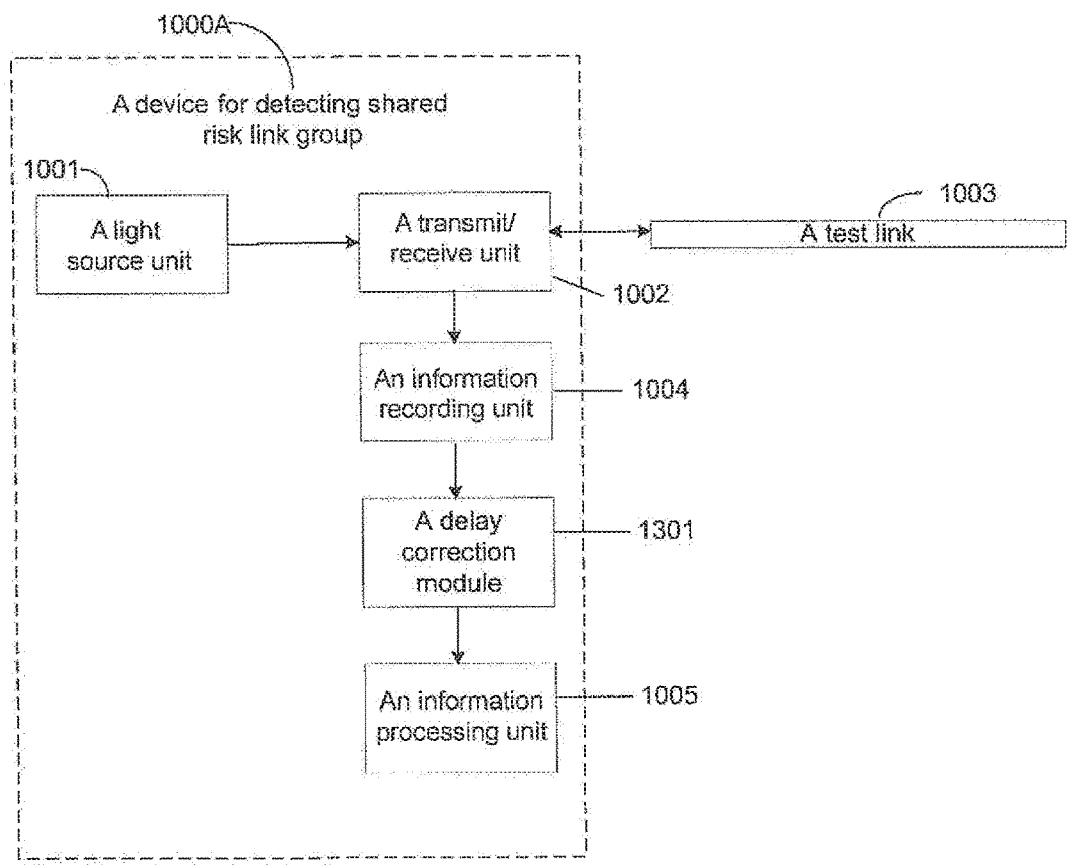
FIG. 13 is a block diagram of a device for detecting shared risk link groups in accordance with another embodiment of the present invention.

FIG. 13 is a block diagram of device 1000A for detecting shared risk link groups in an embodiment of the present invention. Device 1000A includes an additional module relative to the device described in FIG. 10. Device 1000A includes delay correction module 1301 used for performing delay correction in the first and second curves to obtain a first revised curve and a second revised curve, and for sending the first revised curve and the second revised curve to information processing unit 1005.

Figure 14:
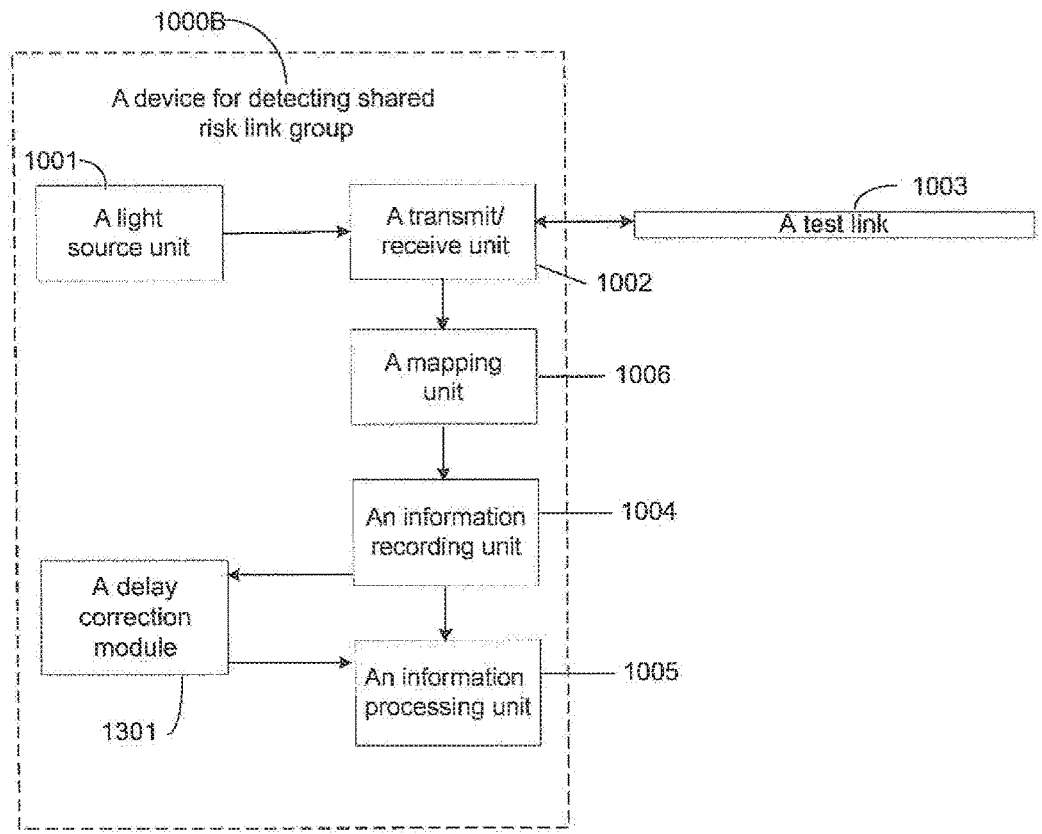
FIG. 14 is a block diagram of a device for detecting shared risk link groups in accordance with another embodiment of the present invention.

FIG. 14 is a block diagram of device 1000B for detecting shared risk link groups in an embodiment of the present invention. This device 1000B includes an additional module relative to the device described in FIG. 11. Device 1000B includes delay correction module 1301 used for performing delay correction in the first and second curves to obtain a first revised curve and a second revised curve, and for sending the first revised curve and the second revised curve to information processing unit 1005.

Figure 15:
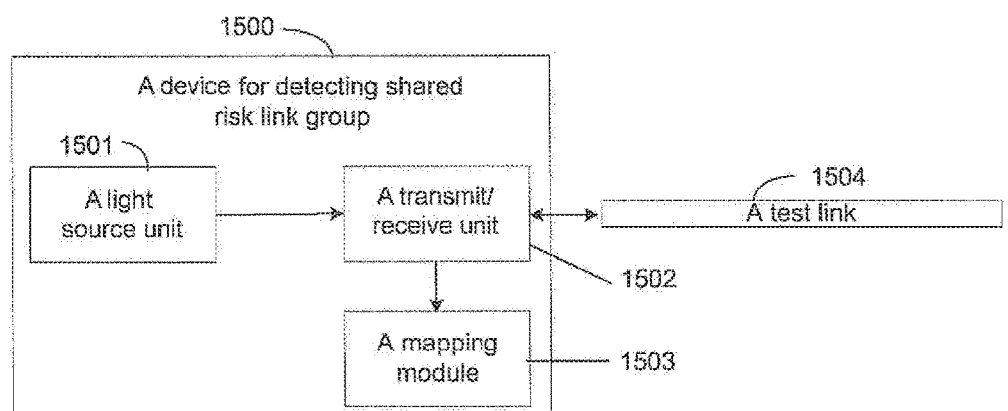
FIG. 15 is a block diagram of a device for detecting shared risk link groups in accordance with yet another embodiment of the present invention.

In another embodiment of the present invention, a block diagram of device 1500 for detecting shared risk link groups is illustrated in FIG. 15. According to the example of FIG. 15, device 1500 includes a light source unit 1501 used for generating light beam that is injected into transmit/receive unit 1502. Transmit/receive unit 1502 is used for receiving the light beam generated by the light source unit and for injecting the light beam into a first test link and a second test link (both links are identified collectively as element number 1504), and for receiving the first backlight of the light beam returned by the first test link and second backlight of the light beam returned by the second test link. The device also includes mapping unit 1503 used for mapping the polarization characteristic of the first backlight as a first power and mapping the polarization characteristic of the second backlight as a second power. In particular, the light source unit 1501 can be a laser and the receiving module can be a circulator, in one example, and the mapping unit can be a polarizer. The first and second backlight of the light beam comprise Rayleigh backscattered light and Fresnel back-reflected light.

Figure 16:
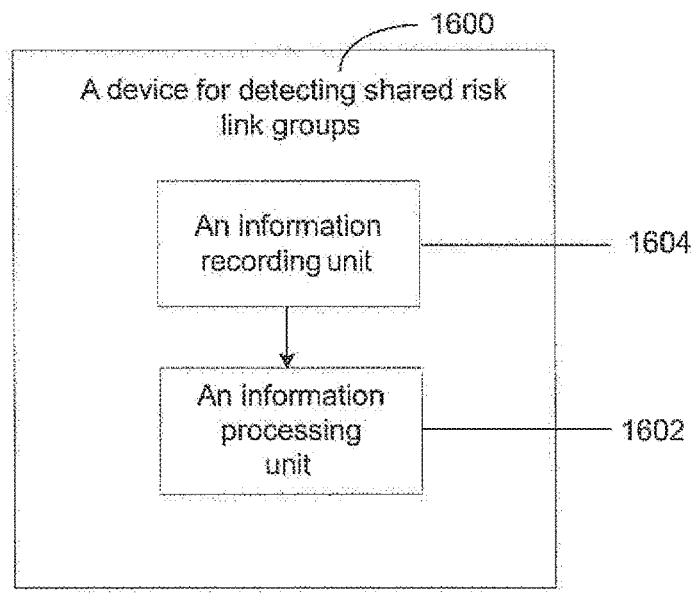
FIG. 16 is a block diagram of a device for detecting shared risk link groups in accordance with another embodiment of the present invention.

In another embodiment of the present invention, device 1600 for detecting shared risk link groups is illustrated in FIG. 16. According to the example of FIG. 16, device 1600 includes information recording unit 1601 used for recording a first curve of a time-varying first power corresponding to the first test link, and a second curve of a time-varying second power corresponding to the second test link. The device also includes information processing unit 1602 used for calculating a resemblance value for the first curve and the second curve and for judging, based on the resemblance value as previously described herein, if the first and the second test links are located in the same shared risk link group.

Figure 17:
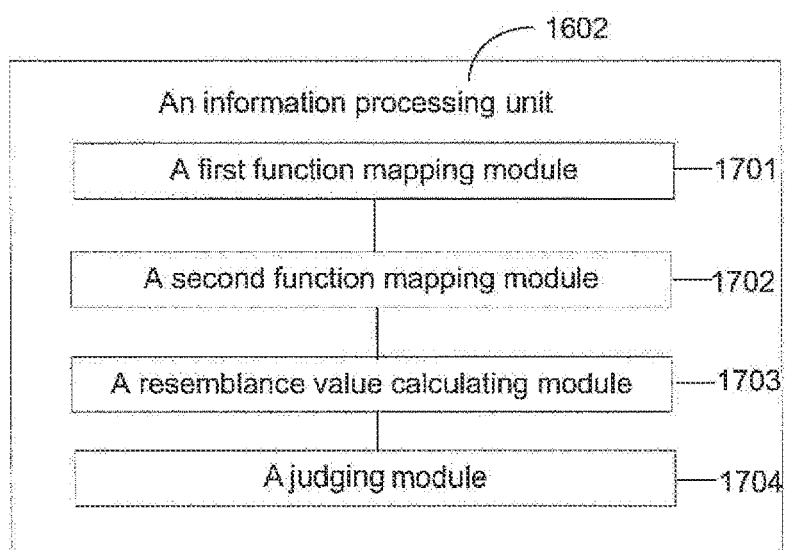
FIG. 17 is a block diagram of an information processing unit in a device for detecting shared risk link groups in accordance with yet another embodiment of the present invention.

FIG. 17 is a block diagram of information processing unit 1602 incorporated in a device for detecting shared risk link groups in an embodiment of the present invention. Information processing unit 1602 includes first function mapping module 1701 used for mapping the first curve as a first function and second function mapping module 1702 used for mapping the second curve as a second function. Information processing unit 1602 further includes resemblance value calculating module 1703 used for calculating the resemblance value for the first function and the second function. Information processing unit 1602 also includes judging module 1704 used for judging, or determining, based on the resemblance value as previously described herein, whether the first test link and the second test link are located in the same shared risk link group.

Furthermore, in an embodiment of the present invention, first function mapping unit 1701 further includes first timeline discretization module 2301 used for mapping, according to a discrete timeline, the first curve as the first function. Associated second function mapping module 1702 further includes second timeline discretization module 2302 used for mapping, according to a discrete timeline, the second curve as the second function.

Figure 24:
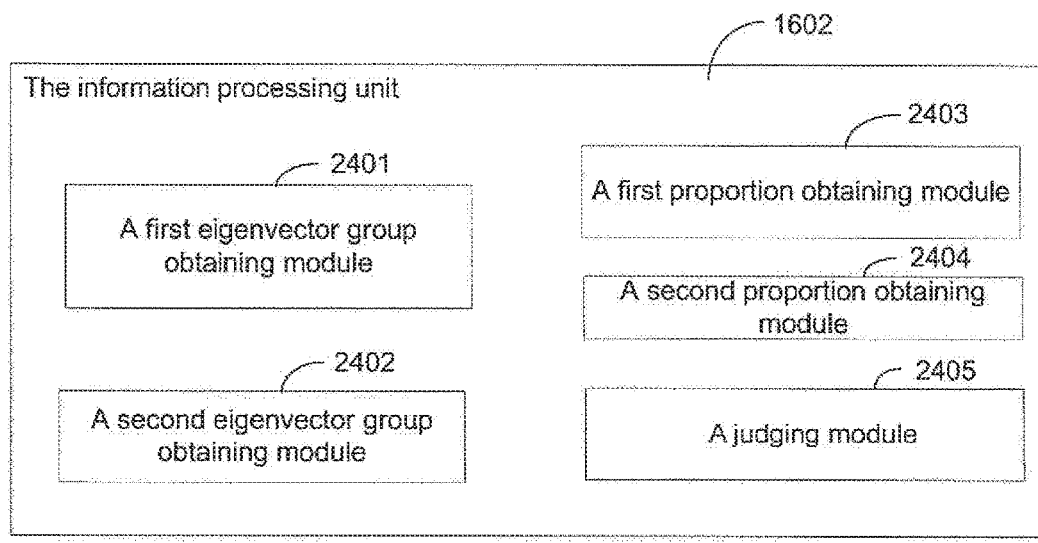
FIG. 24 is a block diagram of an information processing unit in a device for detecting shared risk link groups in accordance with an embodiment of the present invention.

Moreover, in another embodiment of the present invention and with reference to FIG. 24, information processing unit 1602 further includes first eigenvector group obtaining module 2401 used for detecting wave crests and troughs of the first curve to obtain a first eigenvector group of the first curve and second eigenvector group obtaining module 2402 used for detecting wave crests and troughs of the second curve to obtain a first eigenvector group of the second curve. Information processing unit 1602 also includes first proportion obtaining module 2403 used for extracting identical eigenvectors from the first and second eigenvector groups and for calculating a first proportion of the identical eigenvectors in the first eigenvector group. Information processing unit 1602 also includes second proportion obtaining module 2404 used for extracting identical eigenvectors from the first and second eigenvector groups and for calculating a second proportion of the identical eigenvectors in the second eigenvector group. Information processing unit 1602 also includes judging module 2405 used for judging, or determining when both the first proportion and the second proportion exceed a preset threshold, that the first test link and the second test link are located in the same shared risk link group.

Figure 18:
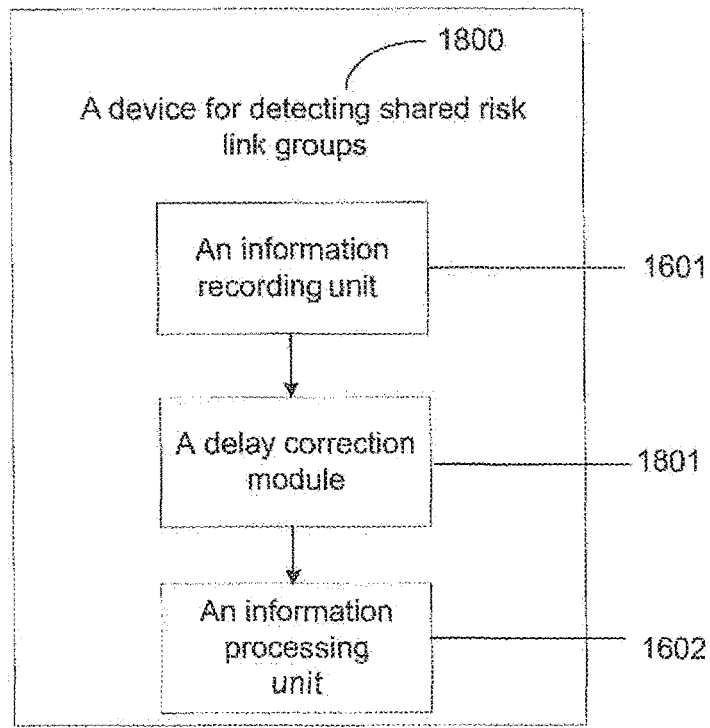
FIG. 18 is a block diagram of a device for detecting shared risk link groups in accordance with yet another embodiment of the present invention.

FIG. 18 is a block diagram of device 1800 for detecting shared risk link groups in an embodiment of the present invention. According to the example of FIG. 18, device 1800 includes an additional module relative to device 1600 described in FIG. 16. Device 1800 includes delay correction module 1801 used for performing delay correction in the first and second curves to obtain a first revised curve and a second revised curve, and for sending the first revised curve and the second revised curve to information processing unit 1602.

According to the embodiments of the present invention, methods and devices are introduced for detecting shared risk link groups by testing a power characteristic of the backlight of a probe beam in test links and, based on that one-dimensional power characteristic, judging or determining whether the test links are in the same shared risk link group. Compared to a three-dimensional component used in conventional techniques, tests using a one-dimensional component are relatively easier. The embodiments of the present invention introduce methods and devices for detecting whether a test link is in a shared risk link group based on a one-dimensional power characteristic, which is simpler in application than conventional techniques.

Many improvements in methods can be considered as direct improvements of hardware circuit configurations in existing technology. The designers program the improved methods into various hardware circuit configurations to obtain associated hardware circuit configurations. For example, a programmable logic device (PLD) and, in particular, a field programmable gate array (FPGA) are types of integrated circuits whose logical function is determined by the programming of the device. The designers program to integrate a digital system on a PLD instead of having a chip manufacturer design and manufacture certain integrated circuit chips. Moreover, such type of programming is implemented using software such as a logic compiler. The logic compiler is similar to the software compiler used in developing and writing a program; a specific programming language (called a hardware description language, HDL) is also required when compiling original code. There are multiple HDLs, such as ABEL (Advanced Boolean Expression Language), AHDL (Advanced Hardware Description Language), Confluence, CUPL (Cornell University Programming Language), HDCal, JHDL (Java Hardware Description Language), Lava, Lola, MyDHL, PALASM, RHDL (Ruby Hardware Description Language), etc. The most commonly used languages are VHDL (Very-High-Speed Integrated Circuit Hardware Description Language) and Verilog 2. Those skilled in the art would appreciate that the hardware circuit for implementing the logic method can be easily obtained by logic programming the languages described above into the integrated circuit.

A controller associated with the hardware circuit can be embodied in any appropriate device. For example, the controller can be embodied as a micro-controller, a controller, a non-transitory computer-readable medium that contains computer-readable programming codes, for example, software or a firmware that can be implemented by the micro-controller or controller, a logic gate, a switch, an application-specific integrated circuit (ASIC), a programmable logic controller, or an embedded micro-controller. Examples of the controller include but are not limited to the following controllers: ARC 625D, Atmel AT91SAM, Microchip PIC18F26K20, and Silicone Labs C8051F320. A storage controller can be embodied as a part of the controlling logic of a storage device.

Those skilled in the art would understand that, besides implementing the controller solely with computer-readable programming code, it can also be embodied by logic programming those steps and methods to have the controller implemented as a logic gate, a switch, an ASIC, a programmable logic controller, or an embedded micro-controller to embody the same functions. Therefore, such a controller can be considered as hardware, and the devices incorporated within can be considered as inner structures of the hardware. Moreover, the devices for implementing various functions can be considered as both a software module of the embodiment and an inner structure of the hardware.

Computer chips, associated entities, or products having certain functions can specifically embody the systems, devices, methods, and modules described in the foregoing.

For the purpose of description, the devices are described as separate modules based on the various functions they perform. However, the functions of the modules can be integrated into one or multiple software/hardware modules to embody the present invention.

It should be appreciated that, based on the descriptions in the foregoing, those skilled in the art would understand the embodiments of the present invention utilize software combined with general hardware platforms. According to such an understanding, the essence or the contribution of the present invention can be presented by a form of software. Such computing software can be stored in storage mediums such as a ROM/RAM, a magnetic disk, or a CD containing a series of commands that cause computing equipment, for example, a personal computer, a server, or a network device, to execute the embodiments or part of the embodiments of the present invention.

In the Claims and Specification of the present invention, terms such as "first" and "second" are only for distinguishing an embodiment or an operation from another embodiment or operation. It does not require or imply that those embodiments or operations have any such real relationship or order. Further, as used herein, the terms "comprising," "including," or any other variation are intended to cover a non-exclusive inclusion such that a process, method, article, or device that comprises a list of elements does not include only those elements but may include other elements not expressly listed or inherent to such process, method, article, or device. Absent further limitation, elements recited by the phrase "comprising a" do not exclude a process, method, article, or device that comprises such elements from including other same elements.

The embodiments of the present invention are described in such a manner that the only differences among different embodiments are highlighted, while the similar parts can be cross-referenced.

The embodiments of the present invention can be used in multiple general or personal computing environments or configurations such as a personal computer, a server computer, a handheld device, a portable device, a tablet device, a multiple processor system, a microcontroller-based system, a set-top box, a programmable consumer electrical device, a network PC, a small-size computer, a large-scale computer, and any distributed computing environments including any of these systems or devices.

Embodiments of the present invention can be described in the context of computer-executed commands. For example, a program module usually includes routines, programs, objects, modules, data structures, etc., that execute certain functions or implement certain abstract data types. The present invention can also be embodied in distributed computing environments using remote processing devices connected through a communication network. In a distributed computing environment, the program module can be located in a local or remote computer storage medium including storage devices.

Embodiments of the present invention are thus described. While the present invention has been described in particular embodiments, it should be appreciated that the disclosure should not be construed as limited by such embodiments, but rather construed according to the below Claims.

What is claimed is:

1. A method of detecting shared risk link groups, the method comprising:
    injecting probe beams into a first test link and a second test link;
    receiving a first backlight and a second backlight of the probe beams back from the first test link and the second test link, respectively;
    filtering the first backlight with a first polarizer such that light with a first designated direction can pass through the first polarizer, and filtering the second backlight with a second polarizer such that light with a second designated direction can pass through the second polarizer;
    detecting and recording a first time-varying response of a power level of the light that passes through the first polarizer, and detecting and recording a second time-varying response of a power level of the light that passes through the second polarizer;
    aligning a time of a first wave crest in the first time-varying response with a time of a first wave crest in the second time-varying response;
    calculating a resemblance value for the first time-varying response and the second time-varying response; and
    determining, based on the resemblance value, whether the first test link and the second test link are located in a same shared risk link group.

2. A method of detecting shared risk link groups, the method comprising:
    injecting probe beams into a first test link and a second test link;
    receiving a first backlight and a second backlight of the probe beams back from the first test link and the second test link, respectively;
    filtering the first backlight with a first polarizer such that light with a first designated direction can pass through the first polarizer, and filtering the second backlight with a second polarizer such that light with a second designated direction can pass through the second polarizer;
    detecting and recording a first time-varying response of a power level of the light that passes through the first polarizer, and detecting and recording a second time-varying response of a power level of the light that passes through the second polarizer;
    calculating a resemblance value for the first time-varying response and the second time-varying response by:
        associating the first and second time-varying responses with a timeline, transforming the timeline into a series of discrete time points, and associating a first power value from the first response and a second power value from the second response with each discrete time point; and calculating the resemblance value from the first power value and the second power value associated with each discrete time point; and determining, based on the resemblance value, whether the first test link and the second test link are located in a same shared risk link group.

3. The method of claim 2, wherein the backlight of the probe beams comprises Rayleigh backscattered light and Fresnel back-reflected light.

4. The method of claim 2, wherein the first time-varying response and the second time-varying response are obtained by an optical time domain reflectometer.

5. A method of detecting shared risk link groups, the method comprising:
   injecting probe beams into a first test link and a second test link;
   receiving a first backlight and a second backlight of the probe beams back from the first test link and the second test link, respectively;
   recording, respectively, a first response of a time-varying first power corresponding to the first backlight and a second response of a time-varying second power corresponding to the second backlight;
   calculating a resemblance value for the first response and the second response, calculating the resemblance value to include:
      associating the first and second responses with a timeline, transforming the timeline into a series of discrete time points, and associating a first power value from the first response and a second power value from the second response with each discrete time point; and
      calculating the resemblance value from the first power value and the second power value associated with each discrete time point; and
   determining, based on the resemblance value, whether the first test link and the second test link are located in a same shared risk link group.

6. The method of claim 5, wherein determining, based on the resemblance value, includes concluding that the first test link and the second test link are located in the same shared risk link group when the resemblance value exceeds a predetermined threshold.

7. A method of detecting shared risk link groups, the method comprising:
   injecting probe beams into a first test link and a second test link;
   receiving a first backlight and a second backlight of the probe beams back from the first test link and the second test link, respectively;
   mapping a polarization characteristic of the first backlight as a time-varying first power, and mapping a polarization characteristic of the second backlight as a time-varying second power;
   recording a first response of the time-varying first power corresponding to the first backlight, and a second response of the time-varying second power corresponding to the second backlight;
   calculating a resemblance value for the first response and the second response, calculating the resemblance value to include:
      detecting wave crests and troughs in the first and second responses to obtain a first eigenvector group of the first response and a second eigenvector group of the second response; and
      extracting identical eigenvectors from the first eigenvector group and the second eigenvector group, and calculating a first proportion of the identical eigenvectors in the first eigenvector group, and a second proportion of the identical eigenvectors in the second eigenvector group; and
   determining, based on the resemblance value, whether the first test link and the second test link are located in a same shared risk link group, the determining to determine that the first test link and the second test link are located in the same shared risk link group when both the first proportion and the second proportion exceed a predetermined threshold.

8. The method of claim 7, further comprising, prior to grouping, aligning a time of a first wave crest in the first response with a time of a first wave crest in the second response.

9. An apparatus for detecting shared risk link groups, the apparatus comprising:
   a light source unit to generate a light beam;
   a transmit/receive unit to:
      receive the light beam generated by the light source unit, and inject the light beam into a first test link and a second test link, and
      receive a first backlight of the light beam returned by the first test link, and a second backlight of the light beam returned by the second test link;
   a first polarizer to filter the first backlight such that light with a first designated direction can pass through the first polarizer, and a second polarizer to filter the second backlight such that light with a second designated direction can pass through the second polarizer;
   an information recording unit to detect and record a first time-varying response of a power level of the light that passes through the first polarizer, and detect and record a second time-varying response of a power level of the light that passes through the second polarizer;
   a delay unit to:
      align a time of a first trough in the first time-varying response with a time of a first trough in the second time-varying response to obtain a first revised response and a second revised response, and
      send the first revised response to the information processing unit as the first time-varying response, and the second revised response to the information processing unit as the second time-varying response; and
   an information processing unit to calculate a resemblance value for the first time-varying response and the second time-varying response, and determine, based on the resemblance value, if the first test link and the second test link are located in the same shared risk link group.

10. An apparatus for detecting shared risk link groups, the apparatus comprising:
   a light source unit to generate a light beam;
   a transmit/receive unit to:
      receive the light beam generated by the light source unit, and inject the light beam into a first test link and a second test link, and
      receive a first backlight of the light beam returned by the first test link, and a second backlight of the light beam returned by the second test link;
   a first polarizer to filter the first backlight such that light with a first designated direction can pass through the first polarizer, and a second polarizer to filter the second backlight such that light with a second designated direction can pass through the second polarizer;
   an information recording unit to detect and record a first time-varying response of a power level of the light that passes through the first polarizer, and detect and record a second time-varying response of a power level of the light that passes through the second polarizer; and an information processing unit to calculate a resemblance value for the first time-varying response and the second time-varying response, and determine, based on the resemblance value, if the first test link and the second test link are located in the same shared risk link group, calculating the resemblance value to include:
  associating the first and second time-varying responses with a timeline, transforming the timeline into a series of discrete time points, and associating a first power value from the first response and a second power value from the second response with each discrete time point; and
  calculating the resemblance value from the first power value and the second power value associated with each discrete time point.

11. The apparatus of claim 10, wherein the light source unit includes a laser.

12. The apparatus of claim 10, wherein the transmit/receive unit includes a circulator.

13. The apparatus of claim 10, wherein the first and second backlight of the light beam include Rayleigh back-scattered light and Fresnel back-reflected light.

14. An apparatus for detecting shared risk link groups, the apparatus comprising:
  a light source unit to generate a light beam;
  a transmit/receive unit to:
    receive the light beam generated by the light source unit, and inject the light beam into a first test link and a second test link, and
    receive a first backlight of the light beam returned by the first test link, and a second backlight of the light beam returned by the second test link;
  an information recording unit to record a first curve of a time-varying first power corresponding to the first backlight, and a second curve of a time-varying second power corresponding to the second backlight; and
  an information processing unit to calculate a resemblance value for the first curve and the second curve, and determine, based on the resemblance value, if the first test link and the second test link are located in the same shared risk link group, the information processing unit to further:
    associate the first and second curves with a timeline, transform the timeline into a series of discrete time points, and associate a first power value from the first curve and a second power value from the second curve with each discrete time point; and
    calculate the resemblance value from the first power value and the second power value associated with each discrete time point.

15. The apparatus of claim 14, wherein the information processing unit to conclude that the first test link and the second test link are located in the same shared risk link group when the resemblance value exceeds a predetermined threshold.

16. An apparatus for detecting shared risk link groups, the apparatus comprising:
  a light source unit to generate a light beam;
  a transmit/receive unit to:
    receive the light beam generated by the light source unit, and inject the light beam into a first test link and a second test link, and
    receive a first backlight of the light beam returned by the first test link, and a second backlight of the light beam returned by the second test link;
  an information recording unit to record a first response of a time-varying first power corresponding to the first backlight, and a second response of a time-varying second power corresponding to the second backlight; and
  an information processing unit to:
    group wave crests and troughs in the first response into a first eigenvector group;
    group wave crests and troughs in the second response into a second eigenvector group;
    extract analogous eigenvectors from the first and second eigenvector groups, and calculate a first proportion of the analogous eigenvectors in the first eigenvector group;
    extract analogous eigenvectors from the first and second eigenvector groups, and calculate a second proportion of the analogous eigenvectors in the second eigenvector group; and
    determine that the first test link and the second test link are located in the same shared risk link group when both the first proportion and the second proportion exceed a predetermined threshold.

17. The apparatus of claim 16, further comprising a delay unit to:
  align a time of a first wave crest in the first response with a time of a first wave crest in the second response to obtain a first revised response and a second revised response, and
  send the first revised response to the information processing unit as the first response, and the second revised response to the information processing unit as the second response.

18. The apparatus of claim 16, further comprising a delay unit to:
  align a time of a first trough in the first response with a time of a first trough in the second response to obtain a first revised response and a second revised response, and
  send the first revised response to the information processing unit as the first response, and the second revised response to the information processing unit as the second response.

* * * * *